United States Patent
Cafarelli et al.

(10) Patent No.: US 6,693,888 B2
(45) Date of Patent: Feb. 17, 2004

(54) METHOD AND APPARATUS FOR FILTERING THAT SPECIFIES THE TYPES OF FRAMES TO BE CAPTURED AND TO BE DISPLAYED FOR AN IEEE802.11 WIRELESS LAN

(75) Inventors: Dominick Anthony Cafarelli, Ossining, NY (US); Kazim Orhan Yildiz, Wayne, NJ (US)

(73) Assignee: Networks Associates Technology, Inc., Santa Clara, CA (US)

(*) Notice: Subject to any disclaimer, the term of this patent is extended or adjusted under 35 U.S.C. 154(b) by 207 days.

(21) Appl. No.: 09/875,544

(22) Filed: Jun. 6, 2001

(65) Prior Publication Data
US 2003/0012163 A1 Jan. 16, 2003

(51) Int. Cl.$^7$ .................................................. H04Q 7/24
(52) U.S. Cl. ........................................................ 370/338
(58) Field of Search ................................. 370/252, 253, 370/328, 338, 329, 352, 401, 465, 466, 349, 241, 312

(56) References Cited

U.S. PATENT DOCUMENTS

| | | | | |
|---|---|---|---|---|
| 5,420,916 A | * | 5/1995 | Sekiguchi | 379/230 |
| 5,560,021 A | * | 9/1996 | Vook et al. | 709/227 |
| 5,570,366 A | * | 10/1996 | Baker et al. | 370/312 |
| 5,640,446 A | * | 6/1997 | Everett et al. | 379/115 |
| 5,778,189 A | * | 7/1998 | Kimura et al. | 709/236 |
| 5,793,771 A | * | 8/1998 | Darland et al. | 370/467 |
| 5,909,429 A | | 6/1999 | Satyanarayana et al. | 370/254 |
| 5,982,762 A | * | 11/1999 | Anzai et al. | 370/338 |
| 5,991,287 A | * | 11/1999 | Diepstraten et al. | 370/338 |
| 6,002,689 A | * | 12/1999 | Christie et al. | 370/401 |
| 6,084,887 A | * | 7/2000 | Salisbury et al. | 370/467 |
| 6,111,893 A | * | 8/2000 | Volftsun et al. | 370/466 |
| 6,151,390 A | * | 11/2000 | Volftsun et al. | 379/229 |
| 6,308,281 B1 | * | 10/2001 | Hall, Jr. et al. | 714/4 |
| 6,336,173 B1 | | 1/2002 | Day, III et al. | 711/161 |
| 6,374,305 B1 | | 4/2002 | Gupta et al. | 709/246 |
| 6,400,729 B1 | * | 6/2002 | Shimadoi et al. | 370/466 |
| 2002/0061741 A1 | | 5/2002 | Leung et al. | 455/414 |

FOREIGN PATENT DOCUMENTS

| | | | |
|---|---|---|---|
| WO | 98/43455 | 10/1998 | H04Q/7/20 |
| WO | 01/37517 | 5/2001 | H04L/29/06 |
| WO | 02/11396 | 2/2002 | H04L/29/00 |

OTHER PUBLICATIONS

AiroPeek™ Wireless Protocol Analyzer; WildPackets, Inc., Walnut Creek, CA.
AiroPeek™ for Windows Quick Tour: Step–by–Step Guide to Key Features; WildPackets, Inc., Walnut Creek, CA.
"AiroPeek Wireless Protocol Analyzer," 4 pages: WildPackets, Inc.; Walnut Creek, CA 94596.
"AiroPeek for Windows Quick Tour," 26 pages; 1989–2001; WildPackets, Inc.; Walnut Creek, CA 94596.

* cited by examiner

Primary Examiner—Chi Pham
Assistant Examiner—Alexander O. Boakye
(74) Attorney, Agent, or Firm—Silicon Valley IP Group, PC; Kevin J. Zilka; Christopher J. Hamaty

(57) ABSTRACT

A method and apparatus provides for wirelessly monitoring data packets or frames transmitted in a wireless LAN, that permits a user to selectively filter out unwanted ones of the data packets or frames with respect to the source and destination hardware addresses, and to the frame type and subtypes.

32 Claims, 13 Drawing Sheets

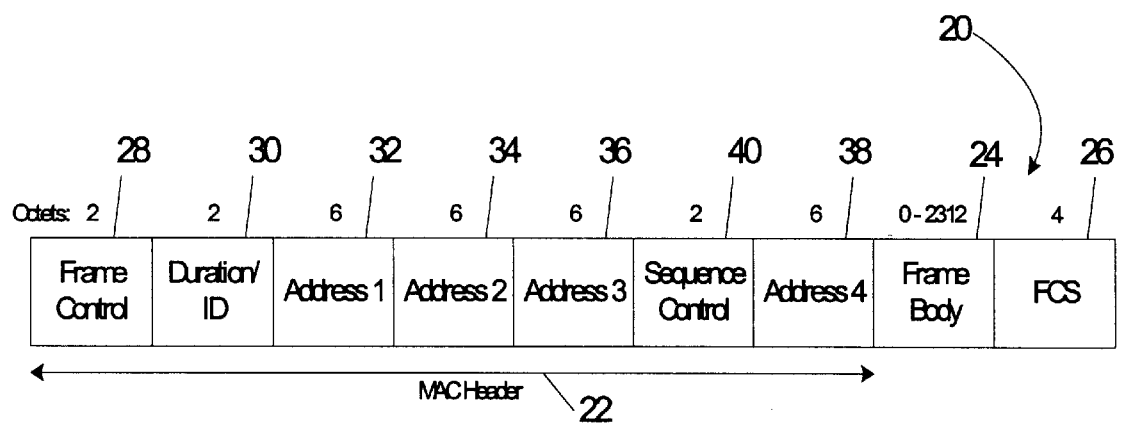
Figure 2A MAC Frame Format
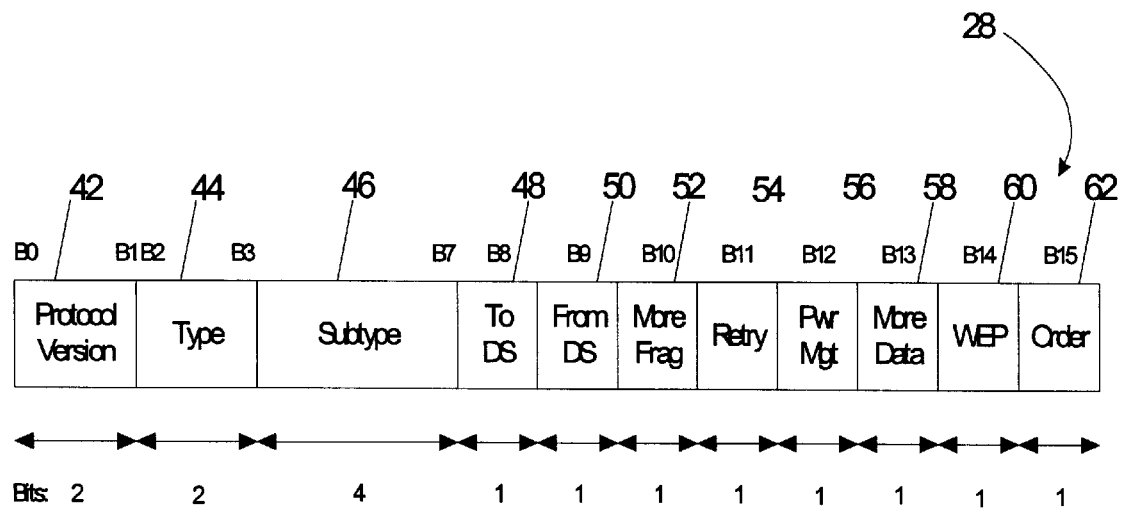
Figure 2B Frame Control Field

METHOD AND APPARATUS FOR FILTERING THAT SPECIFIES THE TYPES OF FRAMES TO BE CAPTURED AND TO BE DISPLAYED FOR AN IEEE802.11 WIRELESS LAN

FIELD OF THE INVENTION

The present invention relates generally to computerized communication networks for permitting computers to communicate with each other in an organized manner, and more particularly to a network troubleshooting tool for detecting, diagnosing, and repairing network failures, which tool includes a method for capturing and selectively filtering data packets or frames transmitted across a wireless communications network such as an IEEE802.11 local area network (LAN).

BACKGROUND OF THE INVENTION

Over recent years, the wireless communication field has enjoyed tremendous growth and popularity. Wireless technology now reaches or is capable of reaching nearly every place on the face of the earth. Hundreds of millions of people exchange information every day using pagers, cellular telephones, and other wireless communication devices. With the success of wireless telephony and messaging services, wireless technology has also made significant inroads into the area of personal and business computing. Without the constraints imposed by wired networks, network users can move about almost without restriction and access a communication network from nearly any location, enabling wireless transmission of a variety of information types including data, video, voice and the like through the network.

Many different forms of data communications protocols have been developed for enabling computers to communicate with one another in an orderly manner. For example, several proprietary versions of wireless local area networks (LANs) were implemented for testing and development. One wireless network standard that was recently adopted by the wireless community is the IEEE802.11 LAN which led to a surge in use of wireless LANs. The IEEE802.11 standard fixes specifications on the parameters of both the medium access control and physical layers for enabling wireless connectivity between fixed, portable, and moving stations within a local area. The term "station" refers hereinafter to an active or passive device part of a computer network that is capable of communicating at least one data packet or frame within the computer network. Such stations include, but are not limited to, personal computers, servers, routers, printers, personal digital assistants, scanners and data collectors, palmtop computers, handheld PCs, pen-based computers, and the like.

According to the IEEE802.11 standard, the physical layer which handles transmission of data between stations, may utilize either direct sequence spread spectrum, frequency hopping spread spectrum or infrared (IR) pulse position modulation. The medium access control layer (MAC) comprises a set of protocols that is responsible for maintaining order in the use of a shared medium. In accordance with the MAC protocol, when a station receives a data packet or frame to be transmitted, it first listens to ensure no other station is transmitting. If the channel is clear, it then transmits the packet. Otherwise, it chooses a random "backoff factor" which determines the amount of time the station must wait until it is allowed to transmit its packet. During periods in which the channel is clear, the transmitting station decrements its backoff counter, and when the channel is busy it does not decrement its backoff counter. When the backoff counter reaches zero, the station transmits the packet. Since the probability that two stations will choose the same backoff factor is small, collisions between packets are thus minimized. In certain environments, before a packet is to be transmitted, the transmitting station initially sends a short request-to-send (RTS) packet containing information on the length of the packet. If the receiving station hears the RTS, it responds with a short clear-to-send (CTS) packet. After this exchange, the transmitting station sends its packet. When the packet is successfully received, as determined by a cyclic redundancy check (CRC), the receiving station transmits an acknowledgment (ACK) packet.

Like wired network counterparts, wireless networks may, during operation, encounter network difficulties or anomalies including, but not limited to, data traffic congestions at peak usage, point failures, and the like. Such network difficulties negatively impact network responsiveness and throughput. As a result, network users experience productivity loss, network processing delays and other disruptions. A measure of a network's performance is often referred to as the quality of service. Quality of service is typically measured by responsiveness, including the amount of time expended waiting for images, text, and other data to be transferred, and by throughput of data across a communications channel. Other aspects may be application-specific, for example, quality of playback, jitter, quality of the data transmitted over the communication channel, and the like. In order to troubleshoot, maintain, and optimize the performance of communication networks, the data traffic flowing through the communication channel is monitored, tested and analyzed to provide rapid detection, diagnosis and correction of network failure and system breakdown, through use of tools developed for this purpose. Network Associates, Inc., of Santa Clara, Calif., has been in the forefront of technology for many years in developing and providing software for managing and troubleshooting computer networks. The software is known as "Sniffer Software".

In the course of testing and analyzing a network's quality of service, a network monitoring tool is typically used to access a passive station positioned at a point along a wired network connection or communication channel through which all the data traffic of interest streams. By accessing the passive station with the network monitoring tool, all the data traffic passing through the corresponding network connection may be easily tracked and observed. Any irregularities in the data traffic flow may then be readily detected and analyzed to determine the source of a particular anomaly. This type of analysis is referred to as promiscuous mode analysis. Such wired network analysis techniques, however, would fail to monitor data traffic transmitted over wireless communications channels. In network systems where wireless and wired networks are connected, the monitoring tool accessing the passive station of the wired network portion would fail to perceive any of the data traffic transmitted along the wireless portion of the network.

For the foregoing reasons, there is a need to provide network analysis tools with a method for extracting data packets or frames transmitted in a network such as between wireless stations, or between wireless stations and access points in a wireless LAN and selectively filtering the captured frames in a facilitated manner for efficient display to a user. One benefit of such a method is that the user may avoid being overwhelmed by a flood of frame data information indiscriminately collected by a network analysis tool by selecting identifying characteristics such as a specific data frame type or function for display and subsequent analysis. This enables the user to better detect and pinpoint the source of network anomaly in a precise, efficient manner during the course of maintaining, troubleshooting, and optimizing the network's quality of service.

SUMMARY OF THE INVENTION

The present invention is generally directed to a method of capturing and filtering data packets or frames transmitted along a wireless communication channel for display. The method of the present invention provides the benefits of efficient network monitoring in real-time mode, thus greatly assisting the maintenance and troubleshooting of the network.

In particular, one aspect of the present invention is directed to a method of capturing and selectively filtering data packets or frames transmitted between stations in a wireless local area network, the method comprising steps of:

(a) establishing a direct wireless logical connection with the wireless communications network;

(b) receiving wirelessly, in real-time, data frames transmitted in the wireless communications network;

(c) receiving frame attribute parameters inputted by a user through a user interface system;

(d) comparing frame attributes of one of the received data frames with the user-inputted frame attribute parameters; and (e) displaying to the user and/or storing in a memory storage device, the data frames that match with the user-inputted frame attribute parameters.

In another aspect of the present invention, there is provided a network monitoring apparatus for capturing and selectively filtering data frames transmitted between stations in a wireless communications network. The apparatus of the present invention comprises:

a wireless network interface device working in a promiscuous mode within a wireless communications network and capturing a plurality of data frames transmitted though the network;

a user interface system comprising input and output devices for enabling a user to input and obtain information associated with the plurality of captured data frames;

a memory storage device for storing the plurality of captured data frames from the wireless communications network;

a processor unit electronically connected to the network interface device, the user interface system, and the memory storage device and being programmed to execute a routine comprising the steps of:

(a) establishing a direct wireless logical connection with the wireless communications network via the network interface device;

(b) receiving wirelessly, in real-time, data frames transmitted in the wireless communications network via the direct wireless logical connection;

(c) receiving one or more frame attribute parameters inputted by a user through the user interface system;

(d) comparing frame attributes of one of the received data frames with the user-inputted frame attribute parameters; and (e) displaying to the user and/or storing in the memory storage device, the data frames that match positively with the user-inputted frame attribute parameters.

BRIEF DESCRIPTION OF THE DRAWINGS

Various embodiments of the present invention are described in detail with reference to the drawings, in which like items are identified by the same reference designation, wherein:

FIG. 2A shows a layout of the general frame format of a MAC frame for the IEEE802.11 standard;

FIG. 2B shows a detailed layout of the frame format of a Frame Control Field of the MAC frame shown in FIG. 2A;

DETAILED DESCRIPTION OF THE INVENTION

The present invention is generally directed to a method and apparatus for capturing and selectively filtering data packets or frames transmitted through a corresponding wireless communication channel for display to a user. The present invention significantly improves network maintenance and troubleshooting by reducing or eliminating unwanted, extraneous data packets, thus reducing the time and effort required for checking and diagnosing network failures or difficulties. The present invention enables the user to easily extract frames that are being transmitted wirelessly between various stations, or between stations and access points in a wireless network system. A recently introduced "Sniffer Wireless" product of Network Associates, Inc., of Santa Clara, Calif. (Assignee of the present invention), incorporates various embodiments of the present invention.

The present invention is used in network analysis tools for wireless Local Area Network (LAN) systems conforming to the IEEE802.11 standard, but is not meant to be so limited. A wireless LAN system includes a plurality of devices or stations, such as workstations, printers, storage devices, servers, and the like connected to one another by wireless communications channels. The wireless LAN is configured so as to enable a message, usually a data packet or frame to be directed from a source to a destination. In this regard, each station of interest is provided with a network address which is unique to that particular station in the computer network. Typically, each station will have a single network address which is used by the system in order to locate that particular station. In this manner, any information or data that is to be transmitted or relayed to a specific station, is accomplished by the use of the network addressing system. Although an IEEE802.11-based wireless LAN system is described in connection with the present invention, one of ordinary skill in the art will understand that the present invention may be applied in other types of communication networks.

Figure 1:
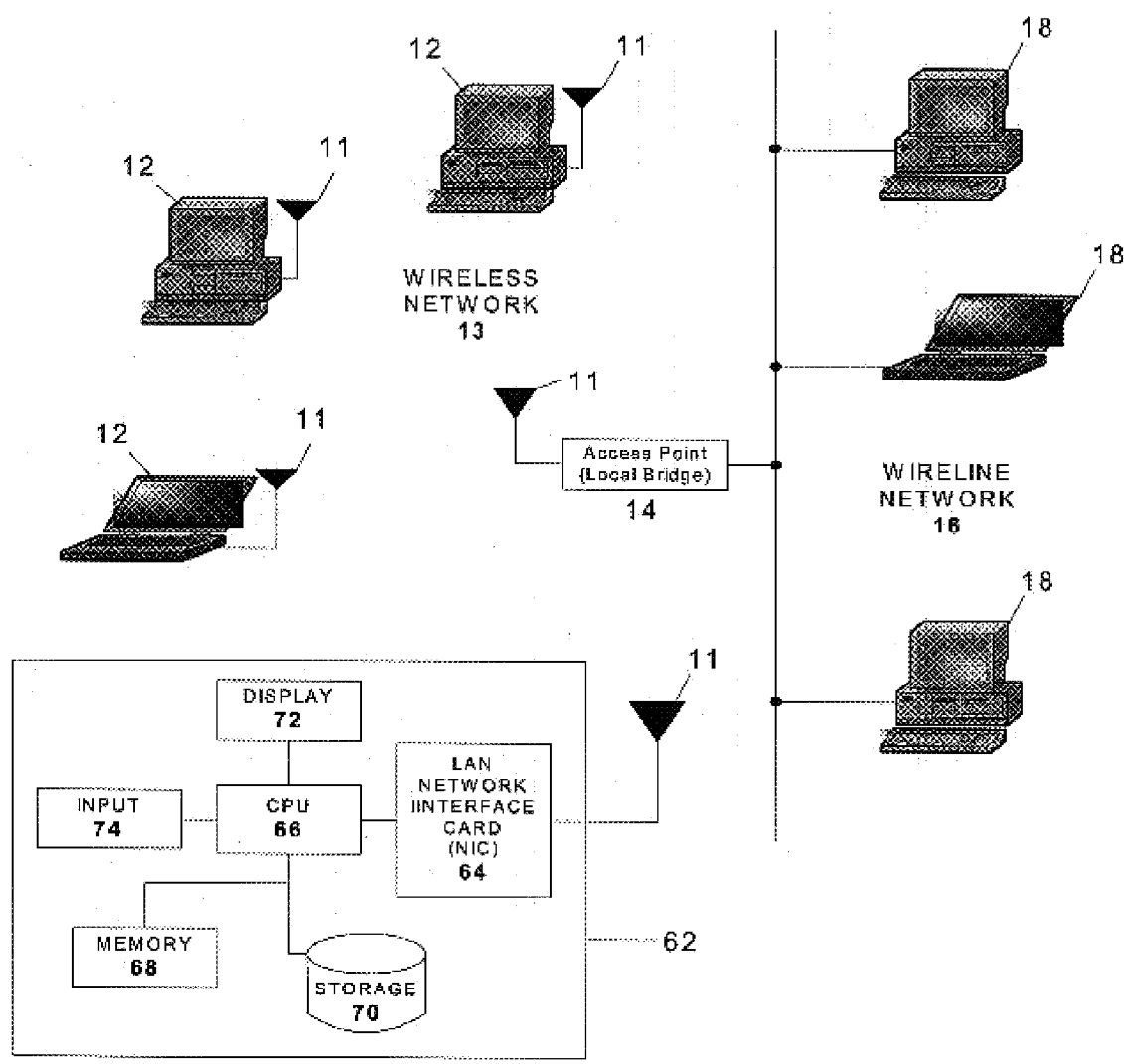
FIG. 1 shows a block schematic diagram of a computer network comprising a wireline network in communication with an IEEE802.11 wireless Media Local Area Network (LAN)

With reference to FIG. 1, one configuration of a LAN-based communication network 10 is shown. The network 10 comprises a plurality of wireless stations 12, and a wireless local bridge or access point 14 connected to a wireline network 16 of a plurality of wired stations 18. Each of the wireless stations 12 include a wireless network interface device 11 for interfacing with other wireless stations 12 and with the access point 14 to form a wireless network 13. Such a wireless network interface device, for example, is a Cisco Aironet Series 340 or Series 350 Wireless Lan Adapter, Cisco Systems, San Jose, Calif., or is a Symbol Technologies Spectrum 24 High Rate Adapter LA-4121-1020US. The wireless network interface device 11 transmits the digital signal from the wireless stations 12 to the wireless medium to enable efficient transfer between a sending station and a receiving station, typically in the form of RF signals. The access point 14 enables communication between the wireless network stations 12 and the wired network stations 18, thereby expanding the associated LAN's capability. Information, control signals and other forms of digital data can be transmitted between stations 12 and 18 in the form of discrete data frames via network 10. The data frames, as one skilled in the art will recognize, are provided in a specific format commonly used in the transmission of data through the network 10.

A wireless network monitoring tool 62 of the present invention includes a wireless network interface device 11 connected to a wireless LAN network interface card (NIC) 64 for creating a connection with the LAN 10 so as to determine the topology of the LAN 10 and to monitor other network functions and data frame transmissions. The monitoring tool 62 further includes a processing unit or CPU 66 to receive information regarding the operation of the network 10. A memory 68 and a storage device 70 are connected to the processor 66 to provide temporary and permanent storage, respectively, of information required by the processor 66. A display unit 72 is connected to the processor 66 so as to display, generally in graphic form, information about the network 10 including its topology, data traffic stream, and functions and services. Through input devices 74 such as a keyboard, a mouse and the like, connected to the processor 66, and through a graphical user interface, a user can perform various analysis of the network 10 and monitor data transmissions, as will be described in detail below. The display unit 72, the input devices 74, and the graphical user interface is collectively referred to as a user interface system. The monitoring tool 62 can be considered just another station in the wireless network, similar to the workstations, printers, storage devices, servers, and so forth, but it runs in a promiscuous mode, which will enable it to receive and analyze the packets sent to other stations as well.

The graphical user interface is preferably executed on a processor capable of supporting at least one of Windows NT 4.0 Windows 98SE, or Windows 2000 Professional. Any one of a number of commercial or proprietary processors may be used. Generally, the processor 66 requires a minimum of 128 MB (Megabytes) of RAM, 256 MB (Megabytes) of Swap Space, and 4 MB (Megabytes) of available disk drive space. The present invention may be built using available components or modules.

For the purposes of this invention, a frame represents a discrete logical unit of data transmitted Through a communications network or channel from a sender station to a receiving station. The data is commonly a fragment of a much larger set of data, such as a file of text or image information. As the larger file is prepared for transmission, it is fragmented into smaller data units. Each fragment of data is packaged into a frame format, which comprises a header, payload, and trailer. The header prepends the payload and includes a set of framing bits, which are used for purposes of frame delineation and synchronization of the receiving station with the speed of transmission across the transmission link. Also included in the header are routing control information, and address information. Following the header is the payload, which contains the data unit being transmitted. Appending the payload is the trailer, which comprises data bits used for error detection and correction, and a final set of framing bits, or ending flag for purposes of frame delineation. The frame format of a frame is specific to the data communications protocol (i.e., IPX, IP, LLC, SNAP, etc.) being utilized in the network. The present invention is described in correspondence with the frame format used in IEEE802.11 LANs, although it will be understood that the present invention may also be modified for use in connection with other types of frame formats and data communications protocols.

The IEEE802.11 wireless LAN system includes a MAC (Medium Access Control) layer embodying a set of protocols which are responsible for maintaining order in the use of a shared medium. There are three types of frames that are transmitted at the MAC layer. The following list summarizes the frame types and subtypes and their main function or service in connection with the 802.11 MAC layer protocols:

1. 802.11 Management Frames: The purpose of 802.11 management frames is to establish and maintain communications between stations and access points. Thus, management frame; provide such services as association and authentication.

a) Association Request frame: A station will send this frame to an access point if it wants to associate with an access point. If the access point grants permission for association, the station will be associated with the access point.

b) Association Response frame: After receiving an Association Request frame, an access point sends an Association Response frame to indicate the result of an association request.

c) Reassociation Request Frame: A station will send this frame to an access point if it wants to reassociate with that access point.

d) Reassociation Response frame: The access point sends the Reassociation Response frame to indicate the result of a reassociation request.

e) Probe Request frame: A station sends a Probe Request frame to obtain information from another station or access point.

f) Probe Response frame: If a station or access point receives a Probe Response frame, it will respond to the sending station with a Probe Response frame containing specific parameters about itself.

g) Beacon frame: In an infrastructure network, an access point periodically sends a Beacon frame that contains a timestamp and configuration information about the access point.

h) ATIM frame: A station which has frames buffered for other stations sends an ATIM (Announcement Traffic Indication Message) frame to each of these stations during an ATIM window immediately following, the transmission of a Beacon frame.

i) Disassociation frame: If a station or an access point wants to disassociate, it will send this frame.

j) Authentication frame: A station sends an Authentication frame to a station or an access point for which it requests secure communication.

k) Deauthentication frame: A station sends a Deauthentication frame to a station or access point for which it requests to end secure communication.

2. Control Frames: After establishing association and authentication between stations and access points, control frames provide the functionality to assist in the delivery of data frames.

a) Request to Send (RTS): A station sends an RTS frame to a receiving station to negotiate the sending of a data frame that will follow.

b) Clear to Send (CTS): The station that is the receiver of the RTS frame sends a CTS frame to acknowledge the right for the sending station to send the data frames.

c) Acknowledgment (ACK): When a station receives an error-free frame, the station can send an ACK frame to the sending station to acknowledge that it successfully received the frame.

d) Power-Save Poll (PS Poll): If a station receives a PS Poll frame, it updates its network allocation vector (NAV), which is an indication of time periods that a station will not initiate a transmission.

e) Contention-Free End (CF End): The CF End frame designates the end of a contention free period.

f) CF End+CF-ACK: This frame acknowledges the Contention-Free End announcement of a CF End frame.

3. Data Frames: The main purpose of data frames is to carry information to the destination station for handoff to its applicable LLC (Logical Link Control) layer.

With reference to FIG. 2A, the frame format of a MAC frame 20 is shown. The frame 20 comprises generally a MAC header 22, a payload or frame body 24, and a trailer or frame check sequence 26. The MAC header 22 may further include at least one of the following information fields: a frame control field 28 for carrying control information being sent from station to station, a duration/ID field 30 for carrying information for identifying the duration of the next frame transmission, Address 1–4 fields 32, 34, 36, and 38, respectively, which convey the Basic Service Set Identification (BSSID), source address, destination address, sending station address, and receiving station address, respectively, and a sequence control field 40 which indicates the sequence number of the frame 20. The frame body 24 includes a variable length payload and carries information that pertains to the specific frame being sent. The data frame may contain a data unit. The MAC management and control frames may include specific parameters in the frame body 24 that pertain to a particular service or network functions the frame is implementing. The frame check sequence 26 contains information that is used to validate successful reception of frame 20. The frame format of the MAC frame 20, shown in FIGS. 2A and 2B, is true for all frames transmitted by a sending, station to a receiving station, regardless of frame type.

As shown in FIG. 2B, the frame control field 28 which carries the critical control information may be further broken down into a protocol version subfield 42, a frame-type subfield 44, a frame-subtype subfield 46, a "To DS" and "From DS" subfields 48 and 50, respectively, a "more frag" subfield 52, a retry subfield 54, a power management subfield 56, a "more data" subfield 58, a wired equivalent privacy (WEP) subfield 60, and an order subfield 62. The protocol version subfield 42 indicates the version number of the data communication protocol creating the frame 20. The type subfield 44 contains information that defines whether the frame 20 is a management, control, or data frame as indicated by the bits in Table 1 below. The subtype subfield 46 contains information that defines the service or function of the frame 20 also shown in Table 1 below.

TABLE 1

Valid Frame Type And Subtype Combinations

| Type value b3 b2 | Type description | Subtype value b7 b6 b5 b4 | Subtype description |
|---|---|---|---|
| 00 | Management | 0000 | Association request |
| 00 | Management | 0001 | Association response |
| 00 | Management | 0010 | Reassociation request |
| 00 | Management | 0011 | Reassociation response |
| 00 | Management | 0100 | Probe request |
| 00 | Management | 0101 | Probe response |
| 00 | Management | 0110–0111 | Reserved |
| 00 | Management | 1000 | Beacon |
| 00 | Management | 1001 | Announcement traffic indication message (ATIM) |
| 00 | Management | 1010 | Disassociation |
| 00 | Management | 1011 | Authentication |
| 00 | Management | 1100 | Deauthentication |
| 00 | Management | 1101–1111 | Reserved |
| 01 | Control | 0000–1001 | Reserved |
| 01 | Control | 1010 | Power Save (PS)-Poll |
| 01 | Control | 1011 | Request To Send (RTS) |
| 01 | Control | 1100 | Clear To Send (CTS) |
| 01 | Control | 1101 | Acknowledgement (ACK) |
| 01 | Control | 1110 | Contention-Free (CF)-End |
| 01 | Control | 1111 | CF-End + CF-Ack |
| 10 | Data | 0000 | Data |
| 10 | Data | 0001 | Data + CF-Ack |
| 10 | Data | 0010 | Data + CF-Poll |
| 10 | Data | 0011 | Data + CF-Ack + CF-Poll |
| 10 | Data | 0100 | Null function (no data) |
| 10 | Data | 0101 | CF-Ack (no data) |
| 10 | Data | 0110 | CF-Poll (no data) |
| 10 | Data | 0111 | Cf-Ack + CF-Poll (no data) |
| 10 | Data | 1000–1111 | Reserved |
| 11 | Reserved | 0000–1111 | Reserved |

The "To DS" subfield 48 and the "From DS" subfield 50 defines whether the frame is destine to a distribution system or leaving a distribution system, respectively. The term "distribution system" refers to a system used to interconnect a set of basic service sets (BSS) and integrated LANs to create an extended service set (ESS). The "more frag" subfield 52 indicates whether another fragment of the same frame 20 will follow in a subsequent frame. The retry subfield 54 indicates whether the frame 20 is a retransmission of an earlier frame where the reason for retransmission may be due to errors in the transmission of the first frame that resulted in an unsuccessful frame check sequence processing.

The power management subfield 56 indicates the power management mode that the sending station will reside after the current frame exchange sequence. A receiving station may utilize this information to adjust transmissions to avoid waking up stations in sleep power mode or power-save mode. The "more data" subfield 58 alerts the receiving station in power-save, mode to prepare to receive additional frames. The "wired equivalent privacy" subfield 60, indicates to the receiving station that the data contained in the frame body 24 has been processed by a wired equivalent privacy algorithm, that is, the data bits have been encrypted using a secret key for increased security and privacy. The order subfield 62 indicates whether the frame 20 was sent using the StrictlyOrdered service class, which tells the receiving station that frames must be processed in a particular order and indicating the order sequence. The bit data contained in the corresponding fields and subfields of the frame 20, provides information as to the frame type and subtype as well as its service or function of the corresponding frame.

The network monitoring tool 62 (as shown in FIG. 1) operates to wirelessly "tap" into the wireless network 13 and capture the data frames transmitted in the network. In one embodiment of the present invention, the user, upon capturing the transmitted frames, may filter the frames with respect to source and destination MAC addresses contained in the frame address fields 32, 314, 36, and 38, and to the frame types 44 and subtypes 46 information contained in the Frame Control Field 28. The MAC address filtering may be carried out using a state-full address filtering process. However, it is noted that the CTS (Clear To Send) and ACK (Acknowledgment) frames do not contain the address of the sending station. For CTS and ACK frames, the filtering software provides a routine that saves the address of the receiving station which was retrieved from the previously transmitted Data or Management frame and use the saved information for analyzing the ACK and CTS frames.

For filtering data frames with respect to hardware addresses, the routine uses the addresses of the source and sending stations for carrying out source address matching, and the addresses of the destination and receiving stations for carrying out destination address matching to determine if the addresses are present in the frame.

The filtering routine of the present invention with respect to MAC frame types and subtypes is accomplished by analyzing the frame type and subtype bit subfields 44 and 46, respectively. The user selects (via a screen display menu, for example) which frame types to filter, and the filtering routine purges or eliminates unwanted MAC frame types, and then displays the desired ones to the user.

The present invention includes filtering software providing a routine that is capable of filtering out the unwanted frames either in real time, or during post-capture analysis. One form of the filtering is done with respect to MAC addresses of the sending station or receiving station, or both, as discussed above.

The MAC frames associated with the other LAN networks such as IEEE802.3 or IEEE802.5 standards, holds only two MAC addresses corresponding to the receiving station and the sending station. The receiving station address may also be in the form of a broadcast (0xFFFFFFFFFFFF), or in the form of a more limited multicast, where the destination is not limited to a single station, but extends to all or specific group of stations, respectively. Except in the case of the group and broadcast addresses, the information relating to source and destination addresses typically correspond to physical stations. In the IEEE802.11 Wireless LAN standard, the MAC frame 20 has the capacity to store and carry 1 to 4 addresses. This format reflects the understanding that the respective addresses of the immediate sending station and the receiving station may not necessarily correspond with the source and destination address, respectively. Referring again to FIG. 2A, the address fields is configured to hold the addresses of the source and destination along with the immediate receiving and sending addresses.

Some control frames may include only an "Address1" field for holding the MAC address of the immediate receiving station. For example, as described above, the ACK (acknowledgment) and CTS (clear to send) control frames fall into this category. The ACK frame is sent as an acknowledgment for the receipt of the previously transmitted data, management or PS-Poll (power save poll) control frame. The CTS frame is sent as a response to a transmitted RTS (request to send) frame. Although the ACK and CTS frames lack the MAC address of the transmitting station, the LAN system is configured to enable the receiving station to recognize that the transmitting address is the same as that contained in the previously transmitted data, management or other control frame.

All other data frames 20 can store and carry between 2 to 4 MAC addresses depending on the particular bit sequence set stored in the Frame Control field 28, specifically in the "To DS" and "From DS" fields 48 and 50. Table 2 lists the possible values of the address fields depending on the bit sequence set for "To DS (Distribution System)" and "From DS" fields, as shown below.

TABLE 2

Address field contents for data frames

| To DS | From DS | Address 1 | Address 2 | Address 3 | Address 4 |
|-------|---------|-----------|-----------|-----------|-----------|
| 0 | 0 | DA | SA | BSSID | N/A |
| 0 | 1 | DA | BSSID | SA | N/A |
| 1 | 0 | BSSID | SA | DA | N/A |
| 1 | 1 | RA | TA | DA | SA |

A station uses the contents of the "Address1" field 32 to perform the address matching address of target receiving stations. In cases where the "Address1" field 32 contains a group address, the BSSID is also validated to ensure that the broadcast or multicast originated in the same BSS (Basic Service Set).

A station uses the contents of the "Address2" field 34 to direct the acknowledgment (if an acknowledgment frame is necessary). The DA (destination address) is the destination of the data residing in the "Frame Body" field 24 of the frame 20. The SA (source address) is the address of the MAC entity that initiated the data that is carried in the "Frame Body" field 24. The RA (receiver address) is the address of the station contained in the access point in the wireless distribution system that is the next immediate intended recipient of the frame. The TA (transmitter address) is the address of the station contained in the Access Point in the wireless distribution system that is transmitting the frame. The "BSSID (Basic Service Set Identification)" field contains either the MAC address of the Access Point or the BSSID of the IBSS (Independent Basic Service Set). If the content of "Address4" field 38 is shown as "N/A (not applicable)" then this address field is omitted from the frame.

The present invention also includes a capability for filtering the frames according to the frame types and frame subtypes. Since the IEEE802.11 standard has several frame types and subtypes, the necessary routine for filtering with respect to frame type is also implemented and described below. The filter software routine is also capable of filtering the frames according to the address of the access point. Therefore, the filtering algorithm needs to take into account not only the source and destination address, but the immediate intended receiver and transmitter addresses also.

Figure 3:
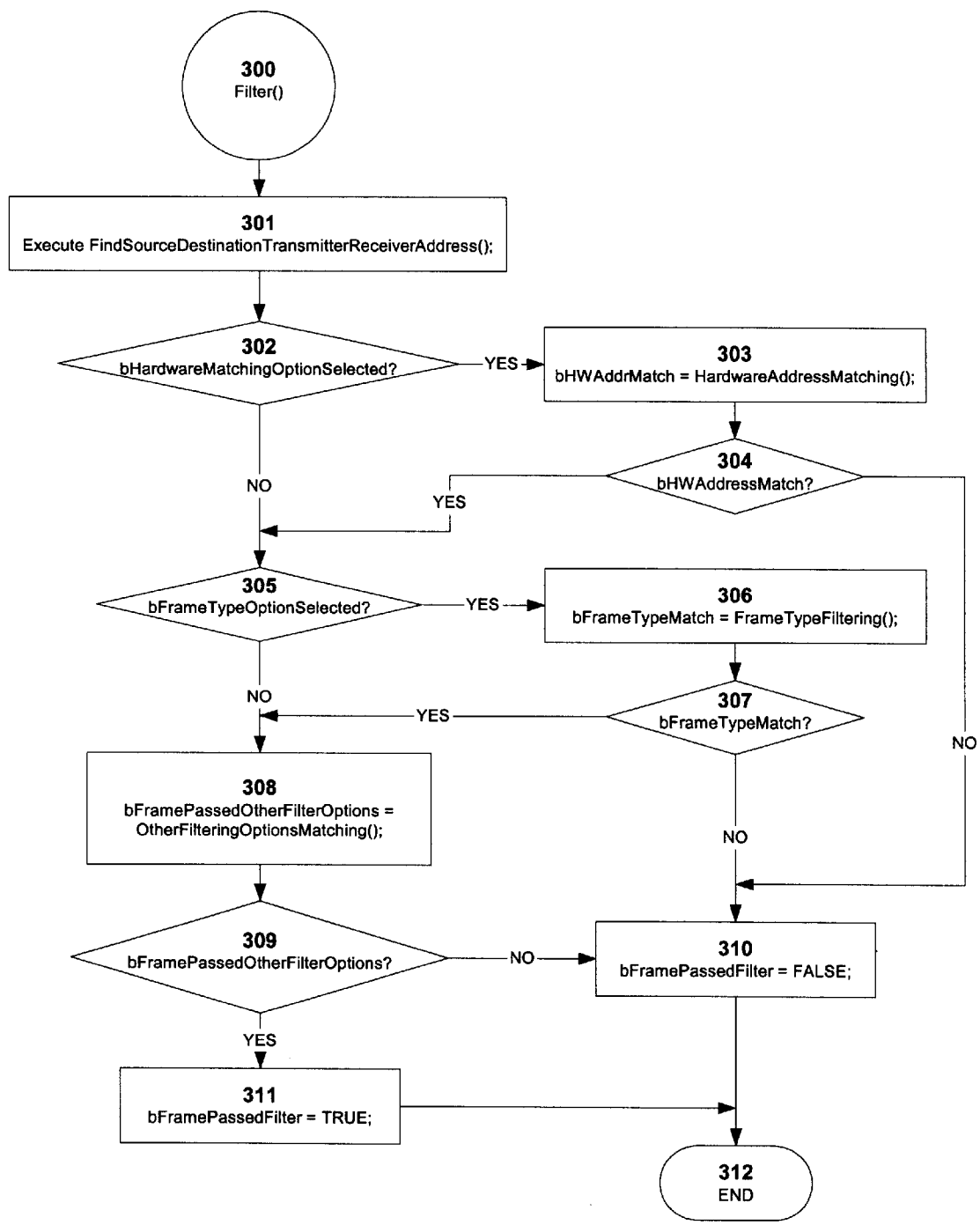
FIG. 3 shows a flowchart of a data frame filtering routine for one embodiment of the present invention.
Figure 6:
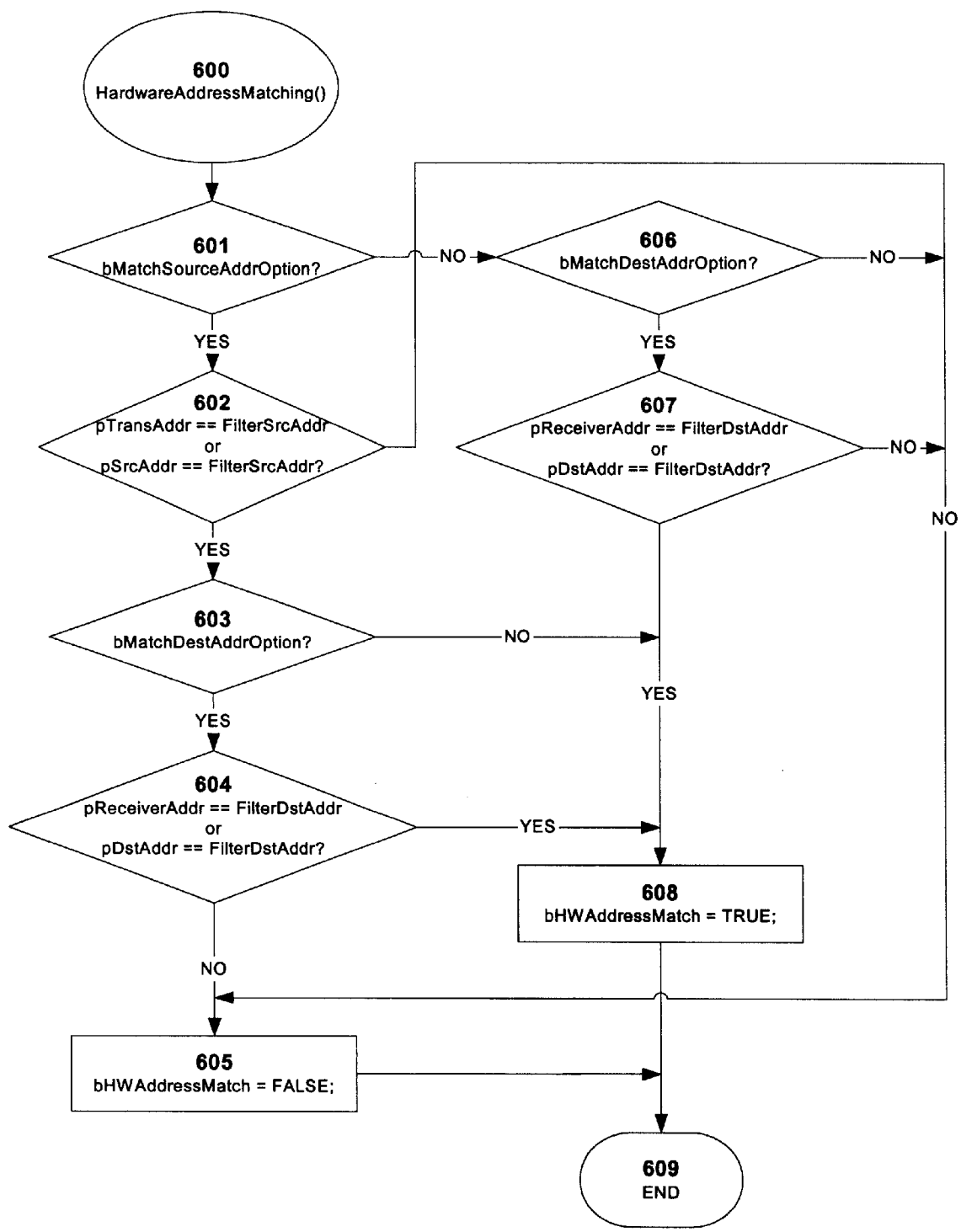
FIG. 6 shows a flowchart of a routine or algorithm for the hardware address matching associated with the filtering routine of the present invention.
Figure 12:
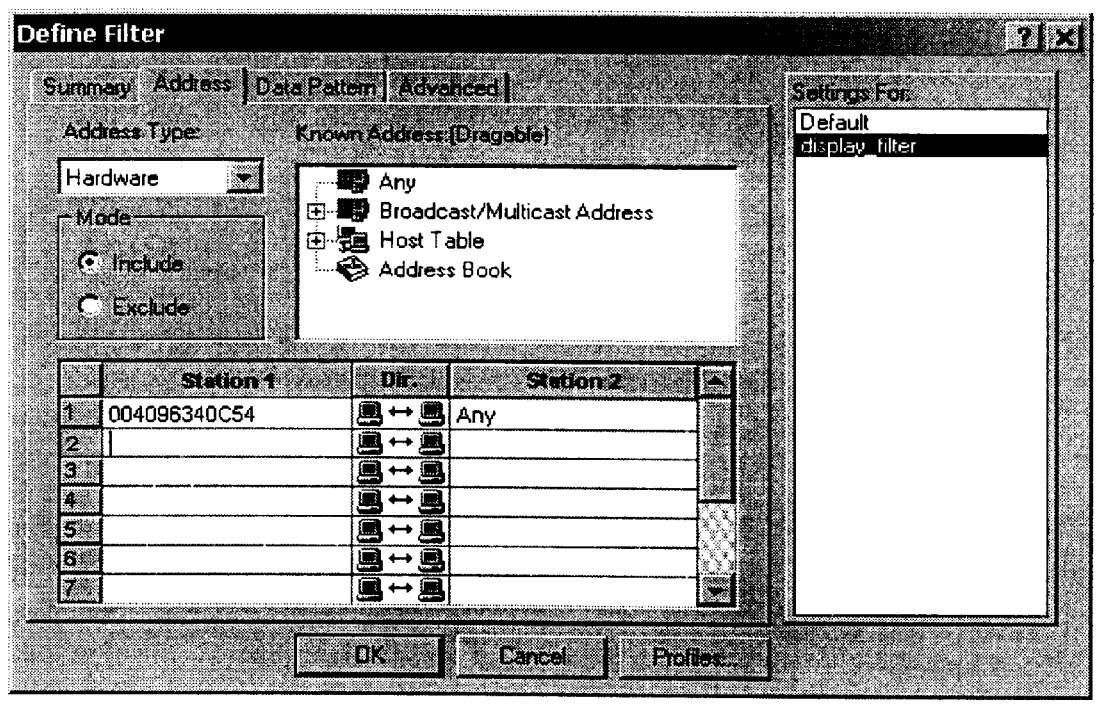
FIGS. 12 and 13 show screen displays for use in one embodiment of the invention.
Figure 13:
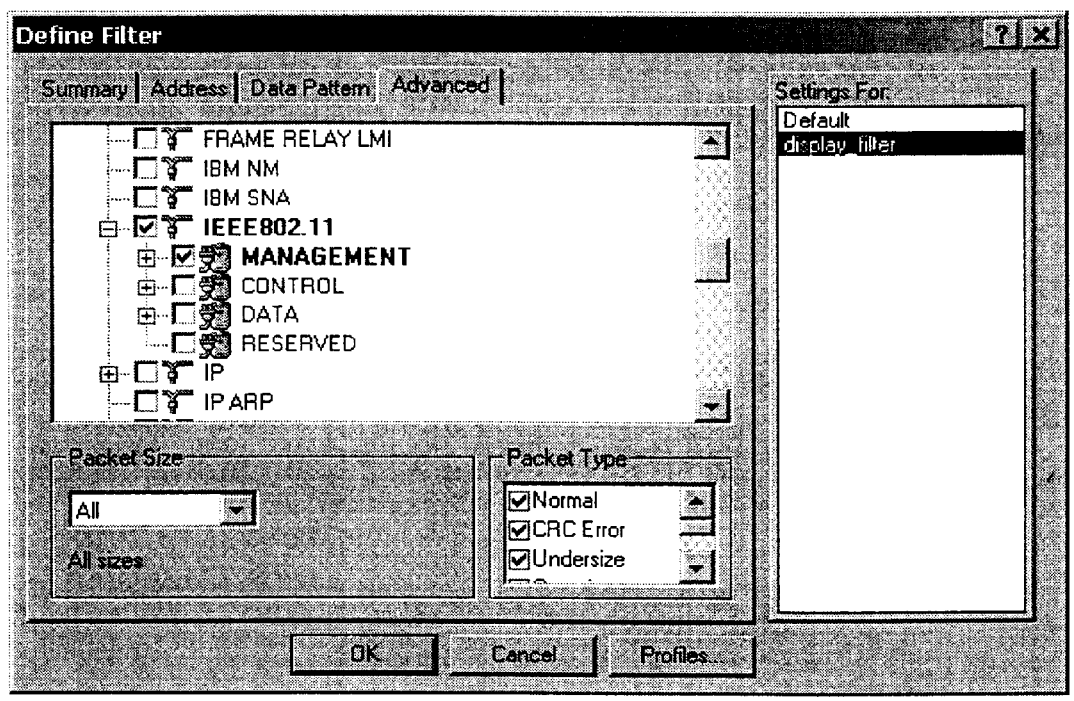

With reference to the flowcharts of FIGS. 3 through 11, the operation of the present invention will be described in greater detail. The following parameters are provided to the implementation of the Filter( ) routine of the present invention. These parameters are provided to determine the filtering options based upon the user's selection or input. The parameters are listed below in Table 3. With reference to FIG. 3, the routine of the present invention is initiated in step 300 of the Filter( ) routine. In step 300, the user selects the filtering options and initiates the filtering process, typically through use of a menu on a display screen. For example, in FIG. 12, a display provided in the "Sniffer Wireless" product of Network Associates, Inc. is shown. A user uses their mouse to place a cursor on "Advanced" to obtain a menu display as shown in FIG. 13 for discriminating what is to be filtered for review. The screen display of FIG. 13 shows a number of frame types that can be selected, but is not meant to be limiting in that many other frame types are available for selection. Also, the menu displays of FIGS. 12 and 13 are not meant to be limiting in that numerous other screen displays can be designed for providing the user interface.

in greater detail by the flowchart of FIG. 6. If the hardware address matches in step 304 or if the hardware address checking was not required by the user as designated by "No" in step 302, the routine proceeds to step 305 of FIG. 3 and determines if the frame type option was selected by the user. If "yes", the routine executes a routine called FrameTypeFiltering( ) at step 306 which is described in greater detail by the flowchart of FIG. 7. If the frame types fail to match in step 307, step 310 is entered, or if the hardware address fails to match in step 304, then the frame is eliminated by the filters routine. If the frame types match or the frame type option was not selected by the user in step 305, then the routine proceeds to step 308 of FIG. 3 and executes a routine called OtherFilteringOptionsMatching( ), and proceeds to step 309. If, in step 309, the data frames do not conform to the other filtering options, or if the hardware address does not match in step 304, then the routine proceeds to step 310, where the frames are discarded and filtered out. If the data frames meet the other filtering options in step 309, then the routine proceeds to step 311 where the data frames are stored in a memory device or displayed to the user, and the filter routine 300 is terminated at step 312.

Figure 4:
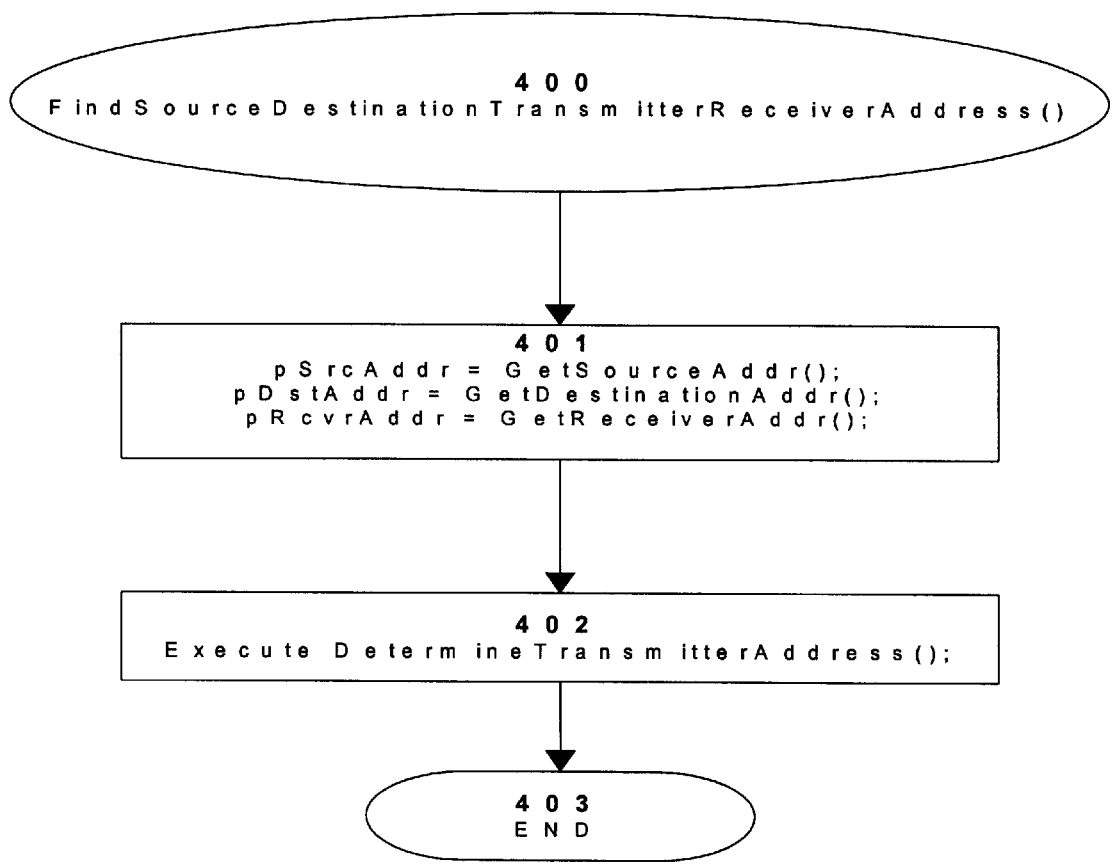
FIG. 4 shows a flowchart of a routine for determining the source, destination, transmitter and receiver address in a frame associated with the filtering routine of the present invention.

As shown in FIG. 4, the software initiates a routine called FindSourceDestinationTransmitterReceiverAddress( ) denoted by step 400. The routine referred generally as step

TABLE 3

Parameters Input For The Implementation Of Filter( ) Routine

| Parameter name | Size (bits) | Description |
| --- | --- | --- |
| bHardwareMatchingOptionSelected | 32 | This is an integer from 0–1 indicating if the filtering algorithm should include the selected hardware addresses |
| bFrameTypeOptionSelected | 32 | This is an integer from 0–1 indicating if the filtering algorithm should include the selected frame types and subtypes |
| bMatchSourceAddrOption | 32 | This is an integer from 0–1 indicating if the hardware filtering should be done for the source address |
| bMatchDestAddrOption | 32 | This is an integer from 0–1 indicating if the hardware filtering should be done for the destination address |
| FilterSrcAddress | 48 | This is a 6-byte-array holding the value of the source address to be filtered |
| FilterDstAddress | 48 | This is a 6-byte-array holding the value of the destination address to be filtered |
| FrameTypeToFilter | 32 | This is an integer that holds the value of the frame type to be filtered |
| FrameSubTypeToFilter | 32 | This is an integer that holds the value of the frame subtype to be filtered |

With respect to the flowchart of FIG. 3, the Filter( ) programming routine is defined in steps 300 through 312. The filters routine filter( ) the frames extracted or captured wirelessly from the network 10 using the user selected parameters. The routine first determines the source, destination, receiver, and the transmitter address of the frame by executing a routine referred as FindSourceDestinationTransmitterReceiverAddress( ) at step 301 as described in greater detail by the flowchart of FIG. 4. In step 302 of FIG. 3, the routine next determines if the user selected the hardware address filtering option. If "yes", the routine proceeds to step 303 to execute a routine referred as HardwareAddressMatching( ) which is described 301 in FIG. 3, functions to determine the source, destination, receiver and transmitter addresses of the data frame. After initiating the routine 301 via step 400, the programming or routine proceeds to step 401 where the following functions are executed: GetSourceAddr( ) which is described in greater detail by the flowchart of FIG. 8, GetDestinationAddr( ) which is described in greater detail by the flowchart of FIG. 9, and GetReceiverAddr( ) which is described in greater detail by the flowchart of FIG. 10. Once the source, destination, and receiver addresses are determined, the programming proceeds to step 402 where the DetermineTransmitterAddress( ) is executed. For certain data frames such as the ACK and CTS frames, the frames do not specify either the source or the transmitter address, the software routine or programming determines the transmitter address at step 402 which is described in greater detail by the flowchart of FIG. 5. Upon completion of step 402, step 403 is entered for terminating, branch routine 301.

Figure 5:
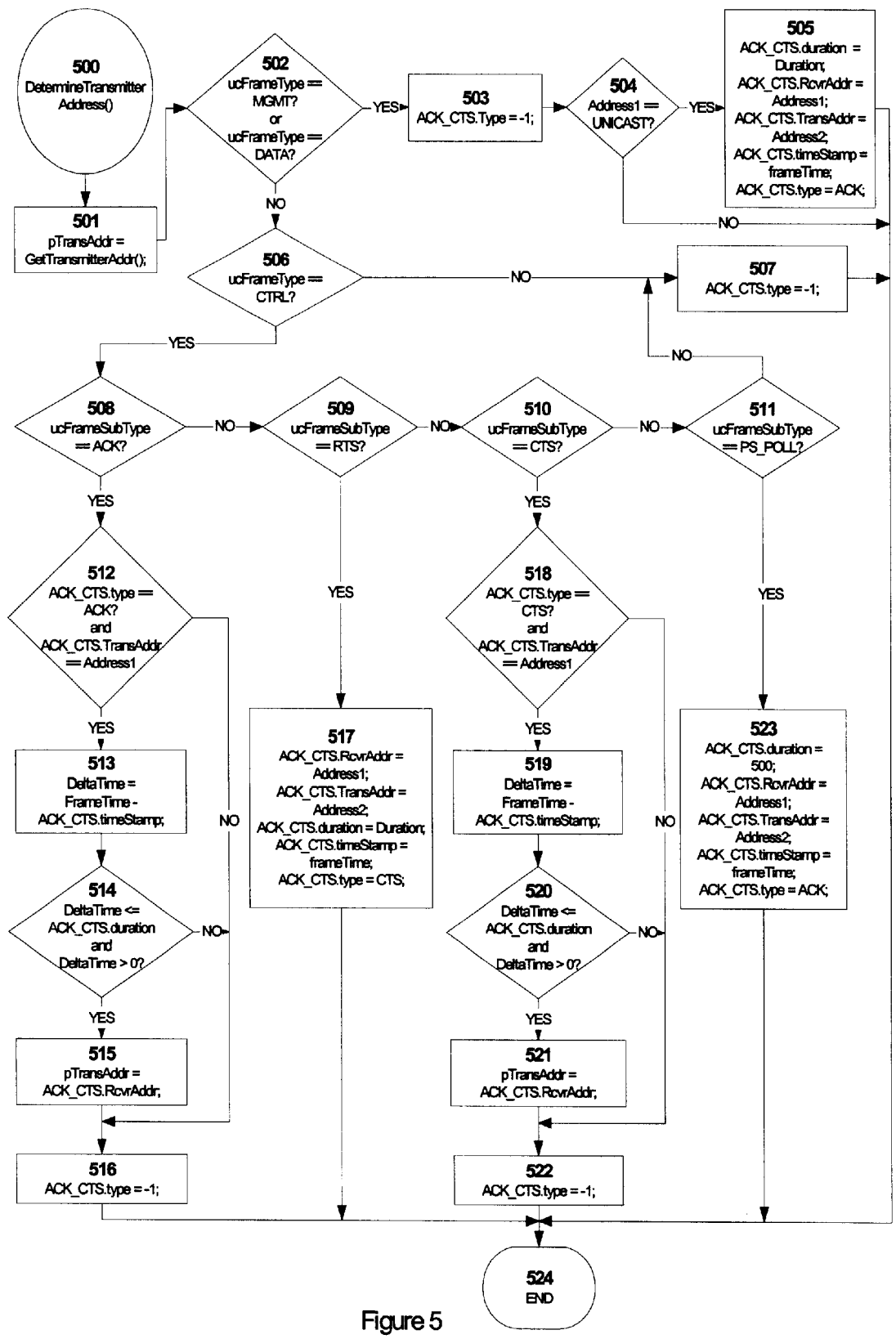
FIG. 5 is a flowchart showing a software routine for determining the address of the station transmitting the frame associated with the filtering routine of the present invention.

With reference to FIG. 5, the program executes the DetermineTransmitterAddress( ) routine (step 402 of FIG. 4) as denoted by steps 500 to 522. The role of this branch routine 402 is to determine the transmitter address of the data frames. Since the ACK and CTS frames do not carry either a source address or the transmitter address, the routine uses a state variable to determine the transmitter address for these frames. The variable m_frameAck holds the state of the transmitter address of the ACK frames, whereas the variable m_RTS_CTS holds the state of the transmitter address of the CTS frames. Upon initiation of step 402, step 500 activates the subprogram, and the routine proceeds to step 501 where the GetTransmilterAddr( ) function is executed via a subprogram or subroutine as described by the flowchart of FIG. 11. For ACK and CTS frames the transmitter address returns a NULL. The ACK and CTS frames do not indicate the source address, the routine is not able to directly determine from which station the frame originated. Therefore, the routine proceeds to step 502 of FIG. 5 to determine the source of the ACK and CTS subtypes. At step 502, the routine determines whether the frames are management or data frames. If the frame is a data frame or management frame the routine proceeds to step 503 to determine if the Address1 field is a unicast address type (i.e., type where the receiving address represents a single station), because only unicast addresses are acknowledged. If the Address1 field is unicast then the receiver address, duration and the timestamp of the current management or the data frame is read and stored from the frame to the state variable m_frameAck at step 504. The duration field stores the time period information as to the time required for transmitting the next frame. The time stamp indicates the time that the frame arrived.

With reference to FIG. 5, the program executes the DetermineTransmitterAddress( ) routine (step 402 of FIG. 4) as denoted by steps 500 to 524. The role of this branch routine 402 is to determine the address of the frames. Since the ACK and CTS frames do not carry either a source address or the transmitter address, the routine uses a state variable to determine the transmitter address for these frames. The variable ACK_CTS holds the state of the transmitter address of the ACK and CTS frames. Upon initiation of step 402, step 500 activates the subprogram, and the routine proceeds to step 501 where the GetTransmitterAddr( ) function is executed via a subprogram or subroutine as described by the flowchart of FIG. 11. For ACK and CTS frames the transmitter address returns a NULL. The ACK and CTS frames do not indicate the source address, the routine is not able to directly determine from which station the frame originated. Therefore, the routine proceeds to step 502 of FIG. 5 to determine the source of the ACK and CTS subtypes. At step 502, the routine determines whether the current frame is a management or a data frame. If the frame is a data frame or management frame the routine proceeds to step 503 to set the type field of the state variable ACK_CTS to an invalid state, because there can only be a single frame outstanding at a time. Reception of a data or management frame automatically resets the state of any outstanding ACK or CTS frame. The routine then proceeds to step 504 to determine if the Address 1 field of the current frame is a unicast address type (i.e., type where the receiving address represents a single station), because only unicast addresses are acknowledged. If the Address 1 field is unicast then the receiver address, transmitter address, duration, and timestamp of the current management or the data frame is read and stored from the current frame to the state variable ACK_CTS at step 505. The duration field stores the time period that is required to transmit this management or data frame, an inter frame time spacing, and the ACK frame. The time stamp indicates the time that the frame arrived. At step 505, the type field of the state variable ACK_CTS is set to ACK to indicate the next expected frame is an ACK.

If the current frame type is not a management or data, the routine proceeds to step 505 to determine if it is a control frame. If it is a control frame, the routine proceeds to determine the frame subtypes in steps 508–511. If the frame type is Power Save-Poll as determined in step 511, the same state variable ACK_CTS will be updated in step 523. However, ACK_CTS.duration field will be set to 500 microseconds since the Power Save-Poll frames do not indicate the duration field 30. If the frame type is determined to be not a control frame at step 506, then the routine proceeds to step 507 to set the type field of the state variable ACK_CTS to an invalid state.

If the frame type is RTS as determined in step 509, then the receiver address, transmitter address, duration, and the frame timestamp fields of the state variable ACK_CTS will be updated in step 517. The routine also sets the type filed to CTS to indicate the next expected frame is a CTS.

If the frame subtype is ACK as determined in step 508, then the routine checks to see if the type field holds an ACK and the TransAddr filed is equal to Address 1 in step 512. if Yes, the routine calculates the time difference between the time stamp of the current ACK frame, and the time stamp field of the state variable ACK_CTS at step 513. The routine proceeds to step 514 to determine whether the time difference is a positive number and is less than the value stored in the ACK CTS.duration field. If Yes, then the transmitter address of the ACK frame is assigned the value stored in the ACK_CTS.RcvrAddr field in step 515. Next, in response the type field in the state variable ACK_CTS is set to invalid at step 516.

If the frame subtype is a CTS as determined in step 510, then the routine proceeds to step 518 to determine whether ACK_CTS.type field holds a CTS and the TransAddr filed is equal to Address1. If Yes, the routine proceeds to step 519, and calculates the time difference between the time stamp of the current CTS frame and the time stamp field of the state variable ACK_CTS. The routine next proceeds to step 520 to determine whether the time difference is a positive number and is less than the value stored in the ACK_CTS.duration field. If Yes, the routine proceeds to step 521 where the transmitter address of the CTS frame is assigned the value stored in the ACK_CTS.RcvrrAddr field. Next, the type field in the state variable ACK_CTS is set to an invalid value at step 522. Subroutine 402 is terminated at step 524.

As shown in FIG. 6, the routine executes the HardwareAddressMatching( ) subroutine 303 generally shown in FIG. 3 via initiation of step 600. The routine then proceeds to step 601 and determines if the user selected the source address matching option. If "Yes", in step 602 the routine determines if the filter source address matches to either the source address or the transmitter address of the current frame. If there is a source address matching, the routine proceeds to step 603 and checks if the user selected the destination address matching option. If "Yes", the routine proceeds to step 604 and checks to see if the filter destination address matches to either the destination or the receiver address of the current frame. If the result is a match, then the hardware address matching is TRUE as indicated in step 608.

If the user did not select the source address matching option at step 601, then the routine checks in step 606 to see if the destination address matching option is selected. If "Yes", then the routine proceeds to step 607 to determine if the filter destination address matches either the destination or the receiver address of the current frame. If "Yes", then the hardware address matching is TRUE as indicated in step 608. If "No" it is determined in either steps 604 or 607, step 605 is entered for signaling that the Address Match is "FALSE". The subroutine is terminated in step 609.

Figure 7:
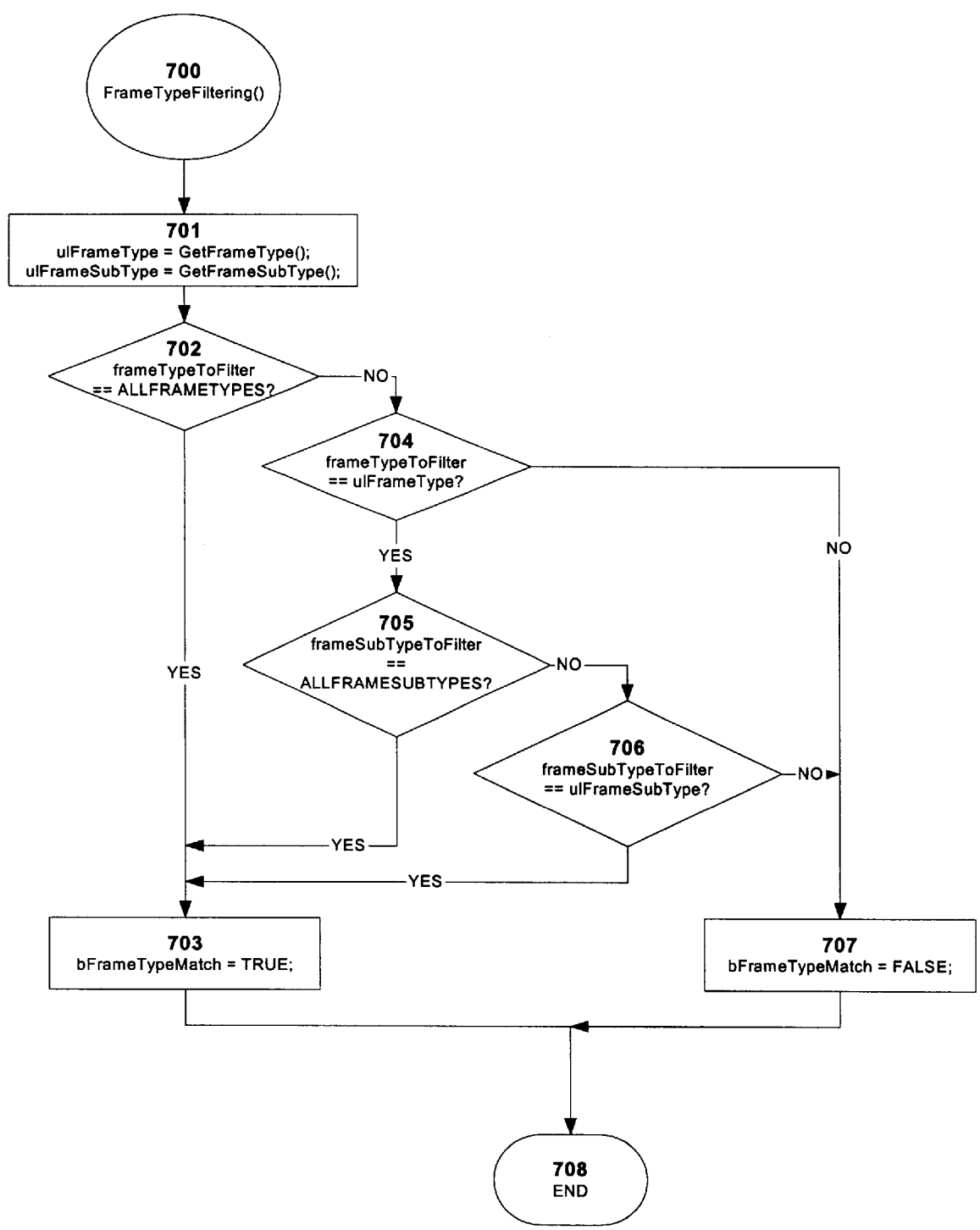
FIG. 7 shows a flowchart of a routine ir algorithm for the frame type filtering associated with the filtering routine of the present invention.

As shown in FIG. 7, the subroutine shown generally as step 306 in FIG. 3 and designated as the function of FrameTypeFiltering( ) denoted by step 700. This function filters the frames according to their frame type and subtypes. The routine proceeds to obtain the GetFrameType( ) and GetFrameSubType( ) functions at step 701 to determine the frame type and subtype of the current frame. The GetFrameType( ) and GetFrameSobType( ) functions return the frame type and subtype by checking the Type and Subtype fields 44 and 46, respectively. The routine determines the frame type and subtype according to the corresponding bit values as listed in Table 1. The routine proceeds to step 702 to determine if the user selected to filter all frame types. If "Yes", then the routine proceeds to step 703 where the frame is permitted passage through the filter. In step 702, if the user selected to filter a specific frame type, then the routine proceeds to step 704 and determines if the frame type matches the selected frame. If "Yes", then the routine proceeds to step 705 to determine if the user selected to filter all frame subtypes. If "Yes" then step 703 is entered. If a specific frame subtype is determined to be selected in step 705, then the routine proceeds to step 706 and determines to see if the frame subtype matches to the one the user selected. If "Yes", then step 703 is entered to accept the frame, and if "No", the routine blocks passage or acceptance of the frame via step 707. In other words, if in step 704, it is determined that the frame type does not match the frame type selected by the user, then in step 707 the frame is not accepted, that is it does not pass through the filter.

Figure 8:
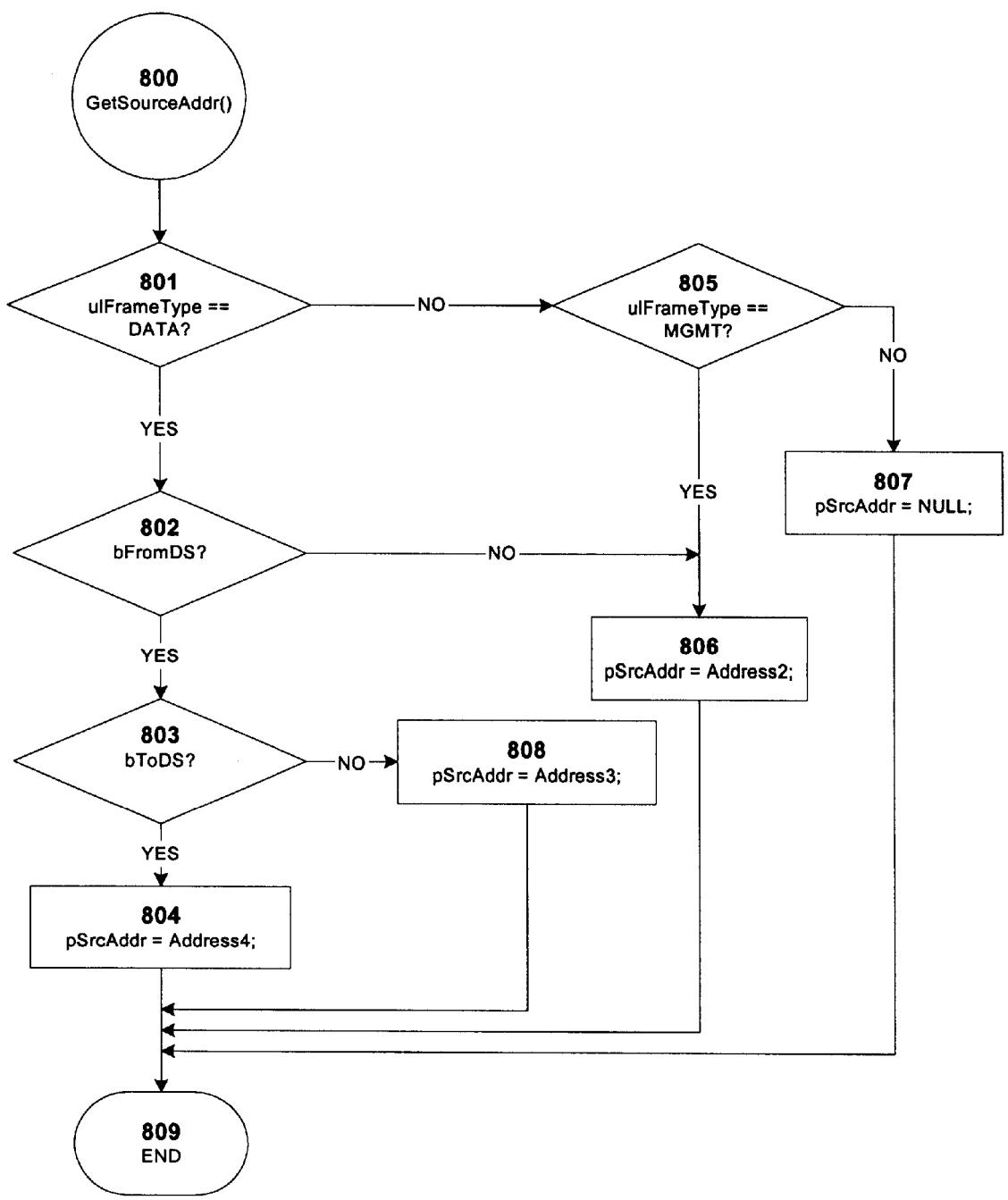
FIG. 8 shows a flowchart of a routine for determining the source address of the frame associated with the filtering routine of the present invention.

As shown in FIG. 8, the subroutine for the a function called GetSourceAddr( ) is provided by programming steps 800–809. This function determines the source address of the frame as generally indicated by step 401 of FIG. 4. The routine first checks to determine if the frame is a Data frame type in step 801. If "Yes", the routine further checks to determine if the FromDS bit of the frame is set to one via step 802. If "Yes", the routine further checks to see if the ToDS bit of the frame is set to one via step 803. If "Yes", the source address is assigned the value at the Address4 field in step 804. If the To DS bit is set to zero in step 803, the source address is assigned the value at the Address3 field in step 808. If the FromDS bit is set to zero in step 802 or the frame is a management frame type in step 805, then the source address is set to the value at Address2 field in step 806. For all other cases the source address is set to NULL in step 807. If in step 801 the frame is not a Data frame, the routine enters step 805.

Figure 9:
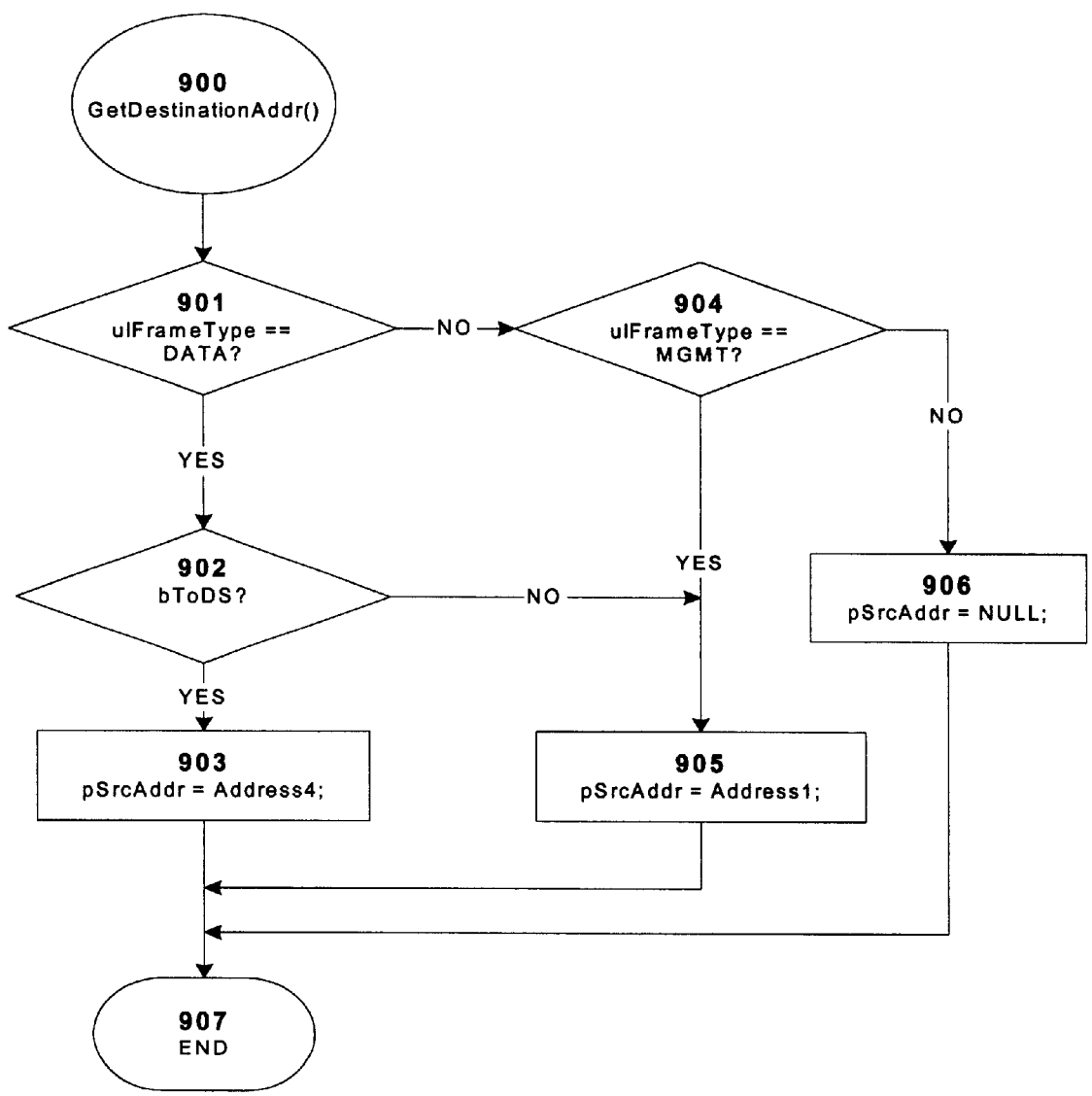
FIG. 9 shows a flowchart of a routine for determining the destination address of the frame associated with the filtering routine of the present invention.

As shown in FIG. 9, the subroutine for the function GetDestinationAddr( ) is provided by steps 900 to 907. This subroutine determines the destination address of the frame as indicated generally by step 401 of FIG. 4. After initiation of this subroutine via step 901 is entered to determine if the frame is a Data frame type. If "Yes", routine proceeds to step 902 to determine if the To DS bit of the frame is set to one.

If "Yes", in step 903 the destination address is assigned the value at the Address4 field. If the ToDS bit is set to zero as determined in step 902, or if the frame is a management frame type as indicated in step 904 then the source address is set to the value at Address1 field in step 905. In step 904, if the frame is not a management type, step 906 is entered wherein the destination address is set to NULL in step 906.

Figure 10:
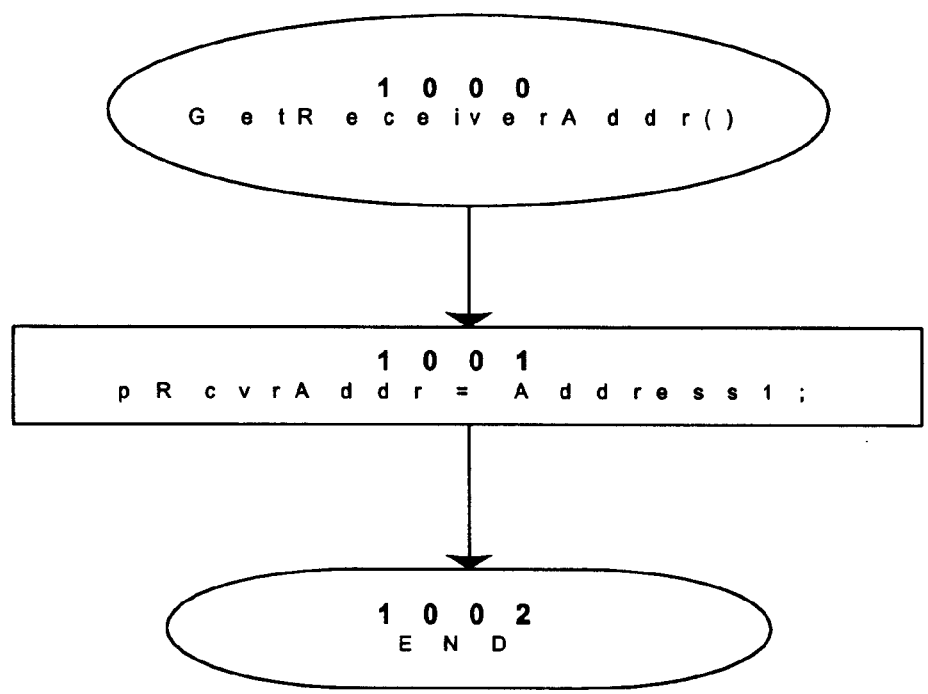
FIG. 10 shows a flowchart of a routine for determining the receiver address of the frame associated with the filtering routine of the present invention.

As shown in FIG. 10, a subroutine for providing the function called GetReceiverAddr( ) is denoted by steps 1000 to 1002. This subroutine determines the receiver address of the frame as indicated generally in step 401 of FIG. 4. Step 401 initiates step 1000 for activation of the subroutine. The routine proceeds to step 1001 wherein the receiver address is assigned the value at the Address1 for all types of frames. The subroutine is terminated at step 1002.

Figure 11:
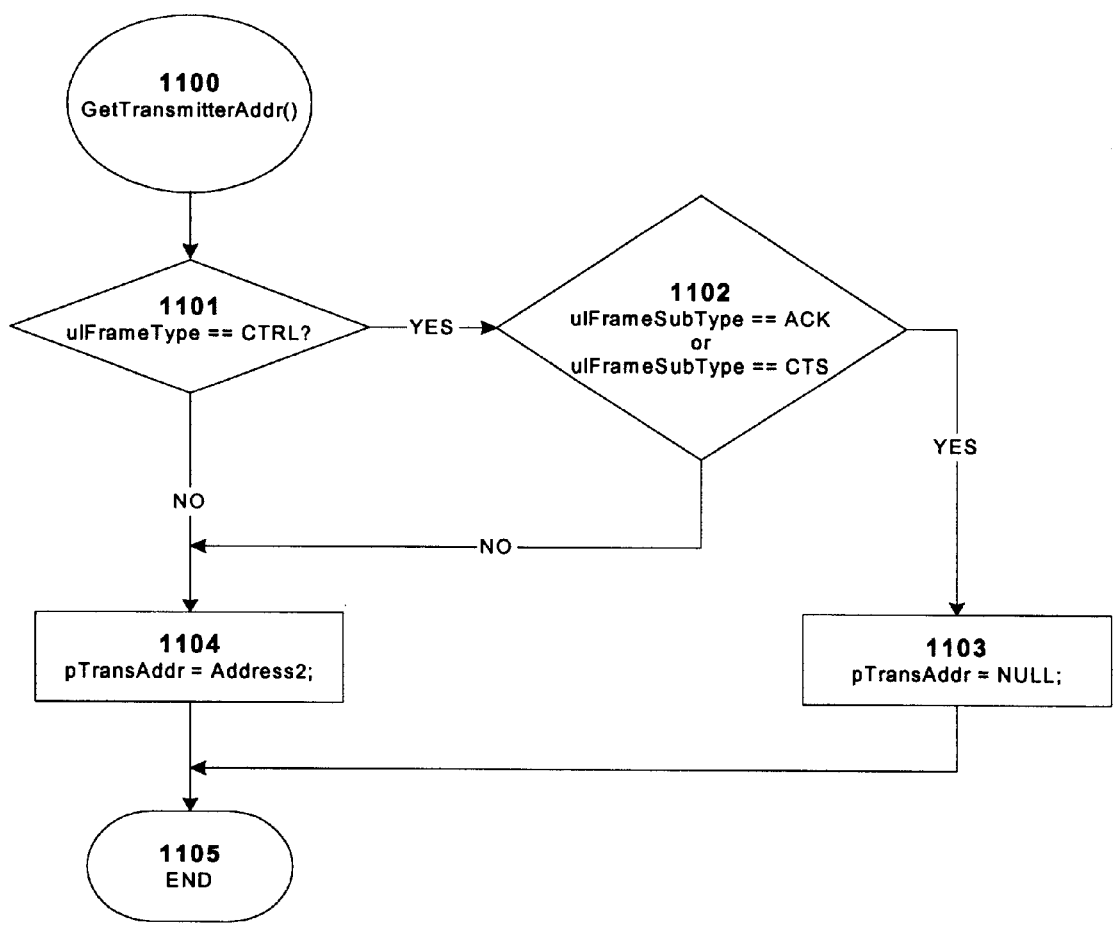
FIG. 11 shows a flowchart of a routine for determining the transmitter address of the frame associated with the filtering routine of the present invention.

As shown in FIG. 11, the subroutine for providing the function called GetTransmitterAddr( ) is provided by programming steps 1100 to 1105. This function determines the transmitter address of the frame generally indicated by step 501 of FIG. 5. Entry of step 501 initiates step 1100, followed by step 1101. The routine initially determines if the frame is a Control frame type via step 1101. If Yes, the routine determines if the frame subtype is ACK or CTS via step 1102. If Yes, the transmitter address is set to NULL via step 1103. For all other cases from steps 1101 and 1102 the transmitter address is assigned the value at the Address2 field via step 1104. The subroutine is terminated at step 1105.

Although various embodiments of the invention have been shown and described, they are not meant to be limiting. Those of skill in the art may recognize various modifications to these embodiments, which modifications are meant to be covered by the spirit and scope of the appended claims.

What is claimed is:

1. A method of capturing and selectively filtering data frames transmitted between stations in a wireless communications network, said method comprising the steps of:

(a) establishing a direct wireless logical connection with the wireless communications network;

(b) receiving wirelessly, in real-time, data frames transmitted in the wireless communications network;

(c) receiving frame attribute parameters inputted by a user through a user interface system;

(d) comparing frame attributes of one of the received data frames with said user-inputted frame attribute parameters; and (e) displaying to the user and/or storing in a memory storage device, the data frames that match with the user-inputted frame attribute parameters;

wherein step (d) further comprises the steps of:
   resolving one or more addresses associated with a received data frame;
   comparing said resolved one or more addresses with the user-selected frame attribute parameters;
   resolving frame type and subtype information associated with the received data frame; and
   comparing said resolved frame type and subtype information with the user-inputted frame attribute parameters;

wherein the address resolving step further comprises:
   securing a source address associated with the received data frame in said memory storage device;
   securing a destination address associated with the received data frame in said memory storage device;

securing a receiver address associated with the received data frame in said memory storage device; and securing a transmitter address associated with the received data frame in said memory storage device.

2. The method of claim 1, further comprising the step of providing a user with capability to select and input frame attribute parameters of data frames desired to be displayed.

3. The method of claim 1, wherein the source address securing step further comprises the steps of:

determining frame type of the received data frame;

registering the source address from an Address2 field of the data frame, if the data frame is a MANAGEMENT type;

checking bit values of FromDS field and ToDS field, if the data frame is DATA type;

registering the source address from an Address 4 field of the data frame, if both bit values of FromDS field and ToDS field is high; and registering the source address from an Address3 field, if bit values of FromDS field and To DS field is high and low, respectively; and registering the source address from an Address2 field, if bit values of FromDS field and To DS field is low and high, respectively.

4. The method of claim 1, wherein the destination address securing step further comprises the steps of:

determining frame type of the received data frame;

registering the destination address from an Address 1 field of the data frame, if the data frame is a MANAGEMENT type;

checking bit values of ToDS field, if the data frame is DATA type;

registering the destination address from an Address 4 field of the data frame, if the bit value of ToDS field is high; and registering the destination address from an Address 1 field of the data frame, if the bit values of To DS field is low.

5. The method of claim 1, wherein the receiver address securing step further comprises the steps of:

determining frame type of the received data frame;

registering the receiver address from an Address 1 field of the data frame, if the data frame is a Control type;

checking bit value of ToDS field, if the data frame is a DATA type; and registering the receiver address from an Address1 field of the data frame, if the bit value of ToDS field is high.

6. The method of claim 1, wherein the transmitter address securing step farther comprises the steps of:

determining the frame type of the received data frame;

determining the frame subtype of the received data frame, if data frame is a Control type;

registering the transmitter address from an Address2 field of the Control data frame, if the data frame is PS-Poll, RTS, CF-End, or CF-End-CF-Ack subtypes;

checking bit value of FromDS field, if the data frame is DATA type; and registering the transmitter address from an Address2 field of the DATA data frame, if the bit value of FromDS field is high.

7. The method of claim 6, further comprising the steps of:

determining if the received data frame is a MANAGEMENT, DATA, or CONTROL frame type;

determining if the received data frame is configured for unicast transmission, and if the received data frame is a DATA or MANAGEMENT type; and recording into memory duration information for an m_frameAck.duration, an Address 1 form_franieAck.ReceiverAddr, and a frameTime for an m_frameAck.timestamp, if the received data frame is configured for unicast transmission.

8. The method of claim 7, further comprising the step of determining if the received data frame is an Acknowledgement, a Request to Send, a Clear to Send, or a Power_Save Poll subtype, if the received data frame is a CONTROL type.

9. The method of claim 1, wherein the step of comparing said resolved one or more addresses step further comprises the steps of:

determining if a match between the secured source address or the transmitter address associated with said received data frame and a user-selected filter source address parameter is present;

determining if a match between the secured receiver address or the destination address associated with said receiver data frame and a user-selected filter source address is present, if the user-selected filter source address parameter matches or if no user-selected source address parameter is inputted by the user; and displaying to the user and/or storing in the memory storage device said received data frame, if either the filter source address parameter match, or the filter destination address parameter match, is positive.

10. The method of claim 1, wherein the step of comparing said resolved frame type and subtype information step further comprises the steps of:

determining if a frame type parameter has been inputted by the user;

comparing the frame type information associated with the received data frame with the frame type parameter, if inputted by the user;

determining if a frame subtype parameter has been inputted by the user;

comparing the frame subtype information associated with the received data frame with the frame subtype parameter, if inputted by the user;

displaying to the user and/or storing in the memory storage device said received data frame, if both the frame type and subtype parameters match with the frame type and subtype information of the received data frame.

11. A network monitoring apparatus (hr capturing and selectively filtering data frames transmitted between stations in a wireless communications network, the apparatus comprising:

a wireless network interface device for establishing a logical connection with a wireless communications network and capturing a plurality of data frames transmitted though said network;

a user interface system comprising input and output devices for enabling a user to input and obtain information associated with said plurality of captured data frames;

a memory storage device for storing said plurality of captured data frames from said wireless communications network;

a processor unit electronically connected to said network interface device, said user interface system, and said memory storage device being programmed to execute a routine comprising the steps of:
(a) establishing a direct wireless logical connection with the wireless communications network via said network interface device;
(b) receiving wirelessly, in real-time, data frames transmitted in the wireless communications network via said direct wireless logical connection;
(c) receiving one or more frame attribute parameters inputted by a user through the user interface system;
(d) comparing frame attributes of one of the received data frames with said user-inputted frame attribute parameters; and
(e) displaying to the user and/or storing in the memory storage device, the data frames that match positively with the user-inputted frame attribute parameters;
wherein step (d) executed by the processing unit further comprises the steps of:
resolving one or more addresses associated with a received data frame;
comparing said resolved one or more addresses with the user-selected frame attribute parameters;
resolving frame type and subtype information associated with the received data frame; and
comparing said resolved frame type and subtype information with the user-inputted frame attribute parameters;
wherein the address resolving step further comprises:
securing a source address associated with the received data frame;
securing a destination address associated with the received data frame;
securing a receiver address associated with the received data frame; and
securing a transmitter address associated with the received data frame.

12. The apparatus of claim 11, wherein the routine executed by the processing unit further comprises the step of providing a user with capability to select and input frame attribute parameters of data frames desired to be displayed.

13. The apparatus of claim 11, wherein the source address securing step executed by the processing unit, further comprises the steps of:
determining frame type of the received data frame;
registering the source address from an Address2 field of the data frame, if the data frame is MANAGEMENT type;
checking bit values of FromDS field and ToDS field, if the data frame is a DATA type;
registering the source address from an Address 4 field of the data frame, if both bit values of FromDS field and ToDS field are high; and
registering the source address from an Address3 field, if bit values of FromDS field and To DS field are high and low, respectively; and
registering the source address from an Address2 field, if bit values of a FromDS field and To DS field are low and high, respectively.

14. The apparatus of claim 11, wherein the destination address securing step executed by the processing unit, further comprises the steps of:
determining frame type of the received data frame;
registering the destination address from an Address1 field of the data frame, if the data frame is a MANAGEMENT type;
checking bit values of ToDS field, if the data frame is a DATA type;
registering the destination address from an Address 4 field of the data frame, if the bit value of ToDS field is high; and
registering the destination address from an Address 1 field of the data frame, if the bit values of To DS field are low.

15. The apparatus of claim 11, wherein the receiver address securing step executed by the processing unit, further comprises the steps of:
determining frame type of the received data frame;
registering the receiver address from an Address1 field of the data frame, if the data frame is Control type;
checking bit value of ToDS field, if the data frame is DATA type; and
registering the receiver address from an Address 1 field of the data frame, if the bit value of ToDS field is high.

16. The apparatus of claim 11, wherein the transmitter address securing step executed by the processing unit, further comprises the steps of:
determining the frame type of the received data frame;
determining a frame subtype of the received data frame, if the data frame is Control type;
registering the transmitter address from an Address2 field of the Control data frame, if the data frame is PS-Poll, RTS, CF-End, or CF-End-CF-Ack subtypes;
checking bit value of FromDS field, if the data frame is DATA type; and
registering the transmitter address from an Address2 field of the DATA data frame, if the bit value of FromDS field is high.

17. The method of claim 16, wherein the routine executed by the processing unit, further comprising the steps of:
determining if the received data frame is a MANAGEMENT, DATA, or CONTROL frame type;
determining if the received data frame is configured for unicast transmission, if the received data frame is a DATA or MANAGEMENT type; and
recording into memory duration information for m_frameAck.duration, Address 1 for m_frameAckReceiverAddr, and fameTime for m_frameAck.timestamp, if the received data frame is configured for unicast transmission.

18. The method of claim 17, further comprising the step of determining if the received data frame is an Acknowledgement, a Request to Send, a Clear to Send, or a Power_Save Poll subtype, if the received data frame is a CONTROL type.

19. The apparatus of claim 11, wherein the resolved one or more addresses comparing step executed by the processing unit, further comprises the steps of:
determining if a match between the secured source address or the transmitter address associated with said received data frame and a user-selected filter source address parameter is present;
determining if a match between the secured receiver address or the destination address associated with said receiver data frame and a user-selected filter source address is present, if the user-selected filter source address parameter matches or if no user-selected source address parameter is inputted by the user; and
displaying to the user and/or storing in the memory storage device said received data frame, if either the filter source address parameter match, or the filter destination address parameter match, is present.

20. The apparatus of claim 11, wherein said resolved frame type and subtype information comparing step executed by the processing unit, further comprises the steps of:
   determining if a frame type parameter has been inputted by the user;
   comparing the frame type information associated with the received data frame with the frame type parameter, if inputted by the user;
   determining if a frame subtype parameter has been inputted by the user;
   comparing the frame subtype information associated with the received data frame with the frame subtype parameter, if inputted by the user;
   displaying to the user and/or storing in the memory storage device said received data frame, if both the frame type and subtype parameters matches with the frame type and subtype information of the received data frame.

21. A method of capturing and selectively filtering data frames transmitted between stations in a wireless communications network, the method comprising:
   establishing a direct wireless logical connection with the wireless communications network;
   receiving wirelessly, in real-time, data frames transmitted in the wireless communications network;
   receiving frame attribute parameters inputted by a user through a user interface system;
   comparing frame attributes of one of the received data frames with the user-inputted frame attribute parameters;
   displaying to the user the data frames that match with the user-inputted frame attribute parameters; and
   displaying traffic stream information of at least a portion of the data frames in graphic form;
   wherein the comparing further includes:
      resolving one or more addresses associated with a received data frame;
      comparing said resolved one or more addresses with the user-selected frame attribute parameters;
      resolving frame type and subtype information associated with the received data frame; and
      comparing said resolved frame type and subtype information with the user-inputted frame attribute parameters;
      wherein the address resolving further comprises:
         securing a source address associated with the received data frame;
         securing a destination address associated with the received data frame;
         securing a receiver address associated with the received data frame; and
         securing a transmitter address associated with the received data frame.

22. The method of claim 21, further comprising storing the data frames being displayed to the user in a memory storage device.

23. The method of claim 22, wherein the stored data frames include at least one time stamp.

24. A method of capturing and selectively filtering data frames transmitted between stations in a wireless communications network, the method comprising:
   establishing a direct wireless logical connection with the wireless communications network;
   receiving wirelessly, in real-time, data frames transmitted in the wireless communications network;
   receiving frame attribute parameters inputted by a user through a user interface system;
   comparing frame attributes of one of the received data frames with the user-inputted frame attribute parameters;
   storing in a memory storage device, the data frames that match with the user-inputted frame attribute parameters; and
   wherein the stored data frames include at least one time stamp;
   wherein the comparing further includes:
      resolving one or more addresses associated with a received data frame;
      comparing said resolved one or more addresses with the user-selected frame attribute parameters;
      resolving frame type and subtype information associated with the received data frame; and
      comparing said resolved frame type and subtype information with the user-inputted frame attribute parameters;
      wherein the address resolving further comprises:
         securing a source address associated with the received data frame;
         securing a destination address associated with the received data frame;
         securing a receiver address associated with the received data frame; and
         securing a transmitter address associated with the received data frame.

25. The method of claim 24, further comprising determining at least one of an address of a transmitter of the data frames and an address of a receiver of the data frames; displaying at least one of the address of the transmitter and the address of the receiver; and displaying traffic stream information of at least a portion of the data frames in graphic form.

26. A network monitoring apparatus for capturing and selectively filtering data frames transmitted between stations in a wireless communications network, the apparatus comprising:
   a wireless network interface device for establishing a logical connection with a wireless communications network and capturing a plurality of data frames transmitted though the network;
   a user interface system comprising input and output devices for enabling a user to input and obtain information associated with the plurality of captured data frames;
   a memory storage device for storing the plurality of captured data frames from the wireless communications network; and
   a processor unit electronically connected to the network interface device, the user interface system, and the memory storage device, and being programmable to execute a routine comprising:
      establishing a direct wireless logical connection with the wireless communications network via the network interface device;
      receiving wirelessly, in real-time, data frames transmitted in the wireless communications network via the direct wireless logical connection;
      receiving one or more frame attribute parameters inputted by a user through the user interface system;
      comparing frame attributes of one of the received data frames with the user-inputted frame attribute parameters;

displaying to the user and/or storing in the memory storage device, the data frames that match positively with the user-inputted frame attribute parameters, wherein the stored data frames include at least one time stamp; and displaying traffic stream information of at least a portion of the data frames in graphic form;

wherein the comparing further includes:
 resolving one or more addresses associated with a received data frame;
 comparing said resolved one or more addresses with the user-selected frame attribute parameters;
 resolving frame type and subtype information associated with the received data frame; and
 comparing said resolved frame type and subtype information with the user-inputted frame attribute parameters.

27. A network monitoring apparatus for capturing and selectively filtering data frames transmitted between stations in a wireless communications network, the apparatus comprising:
 a wireless network interface device for establishing a logical connection with a wireless communications network and capturing a plurality of data frames transmitted though the network;
 a user interface system comprising input and output devices for enabling a user to input and obtain information associated with the plurality of captured data frames;
 a memory storage device for storing the plurality of captured data frames from the wireless communications network; and
 a processor unit electronically connected to the network interface device, the user interface system, and the memory storage device, and being programmable to execute a routine comprising:
  establishing a direct wireless logical connection with the wireless communications network via the network interface device;
  receiving wirelessly, in real-time, data frames transmitted in the wireless communications network via the direct wireless logical connection;
  receiving one or more frame attribute parameters inputted by a user through the user interface system;
  comparing frame attributes of one of to received data frames with to user-inputted frame attribute parameters;
  displaying to the user the data frames that match positively with the user-inputted frame attribute parameters;
  storing in the memory storage device to data frames that match positively with to user-inputted frame attribute parameters, wherein to stored data frames include at least one time stamp;
  determining an address of a transmitter of the data frames and an address of a receiver of the data frames;
  displaying to address of the transmitter and the address of the receiver; and
  displaying traffic stream information of at least a portion of the data frames in graphic form;
  wherein the comparing further includes:
   resolving one or more addresses associated with a received data frame;
   comparing said resolved one or more addresses with the user-selected frame attribute parameters;
   resolving frame type and subtype information associated with the received data frame; and
   comparing said resolved frame type and subtype information with the user-inputted frame attribute parameters.

28. The network monitoring apparatus of claim 27, wherein the wireless communications network includes an IEEE 802.11 local area network.

29. A method of capturing and selectively filtering data frames transmitted between stations in a wireless communications network, said method comprising:
 establishing a direct wireless logical connection with the wireless communications network;
 receiving wirelessly, in real-time, data frames transmitted in the wireless communications network;
 receiving frame attribute parameters inputted by a user through a user interface system;
 comparing frame attributes of one of the received data frames with said user-inputted frame attribute parameters, wherein the comparing further comprises:
  resolving one or more addresses associated with a received data frame, wherein the address resolving further comprises: securing at least one of a media access control (MAC) address and a basic service set identifier (BSSID) associated with the received data frame,
  comparing said resolved one or more addresses with the user-selected frame attribute parameters,
  resolving frame type and subtype information associated with the received data frame, and
  comparing said resolved frame type and subtype information with the user-inputted frame attribute parameters; and
 at least one of displaying to the user and storing in a memory storage device, the data frames that match with the user-inputted frame attribute parameters.

30. A computer program product for capturing and selectively filtering data frames transmitted between stations in a wireless communications network, said computer program product comprising:
 computer code for establishing a direct wireless logical connection with the wireless communications network;
 computer code for receiving wirelessly, in real-time, data frames transmitted in the wireless communications network;
 computer code for receiving frame attribute parameters inputted by a user through a user interface system;
 computer code for comparing frame attributes of one of the received data frames with said user-inputted frame attribute parameters, wherein the comparing further comprises:
  resolving one or more addresses associated with a received data frame, wherein the address resolving further comprises: securing at least one of a media access control (MAC) address and a basic service set identifier (BSSID) associated with the received data frame,
  comparing said resolved one or more addresses with the user-selected frame attribute parameters,
  resolving frame type and subtype information associated with the received data frame, and
  comparing said resolved frame type and subtype information with the user-inputted frame attribute parameters; and
 computer code for at least one of displaying to the user and storing in a memory storage device, the data frames that match with the user-inputted frame attribute parameters.

31. A method of capturing and selectively filtering data frames transmitted between stations in a wireless communications network, said method comprising:
- establishing a direct wireless logical connection with the wireless communications network;
- receiving wirelessly, in real-time, data frames transmitted in the wireless communications network;
- receiving frame attribute parameters inputted by a user through a user interface system;
- comparing frame attributes of one of the received data frames with said user-inputted frame attribute parameters, wherein the comparing further comprises:
  - resolving one or more addresses associated with a received data frame, wherein the address resolving further comprises: securing a source address associated with the received data frame, securing a destination address associated with the received data frame, and securing at least one of a media access control (MAC) address and a basic service set identifier (BSSID) associated with the received data frame, and
  - comparing said resolved one or more addresses with the user-selected frame attribute parameters; and
- at least one of displaying to the user and storing in a memory storage device, the data frames that match with the user-inputted frame attribute parameters.

32. A computer program product for capturing and selectively filtering data frames transmitted between stations in a wireless communications network, said computer program product comprising:
- computer code for establishing a direct wireless logical connection with the wireless communications network;
- computer code for receiving wirelessly, in real-time, data frames transmitted in the wireless communications network;
- computer code for receiving frame attribute parameters inputted by a user through a user interface system;
- computer code for comparing frame attributes of one of the received data frames with said user-inputted frame attribute parameters, wherein the comparing further comprises:
  - resolving one or more addresses associated with a received data frame, wherein the address resolving further comprises: securing a source address associated with the received data frame, securing a destination address associated with the received data frame, and securing at least one of a media access control (MAC) address and a basic service set identifier (BSSID) associated with the received data frame, and
  - comparing said resolved one or more addresses with the user-selected frame attribute parameters; and
- computer code for at least one of displaying to the user and storing in a memory storage device, the data frames that match with the user-inputted frame attribute parameters.

* * * * *